United States Patent
Handa et al.

(10) Patent No.: US 8,281,569 B2
(45) Date of Patent: Oct. 9, 2012

(54) EXHAUST GAS PURIFICATION DEVICE FOR INTERNAL COMBUSTION ENGINE AND METHOD OF CONTROLLING THE EXHAUST GAS PURIFICATION DEVICE

(75) Inventors: Hideyuki Handa, Okazaki (JP); Yasuto Koshida, Kariya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 337 days.

(21) Appl. No.: 12/682,990

(22) PCT Filed: Dec. 8, 2008

(86) PCT No.: PCT/IB2008/003388
§ 371 (c)(1),
(2), (4) Date: Apr. 14, 2010

(87) PCT Pub. No.: WO2009/081247
PCT Pub. Date: Jul. 2, 2009

(65) Prior Publication Data
US 2010/0236221 A1 Sep. 23, 2010

(30) Foreign Application Priority Data
Dec. 18, 2007 (JP) .................. 2007-326412

(51) Int. Cl.
*F01N 3/00* (2006.01)
(52) U.S. Cl. ............. 60/285; 60/274; 60/286; 60/295
(58) Field of Classification Search .............. 60/274, 60/276, 285, 286, 295
See application file for complete search history.

(56) References Cited

U.S. PATENT DOCUMENTS

| | | | | |
|---|---|---|---|---|
| 6,393,834 B1* | 5/2002 | Takaoka et al. | ............... | 60/295 |
| 2004/0050037 A1* | 3/2004 | Betta et al. | .............. | 60/286 |
| 2004/0055285 A1* | 3/2004 | Rohr et al. | .............. | 60/295 |
| 2004/0187483 A1* | 9/2004 | Dalla Betta et al. | .......... | 60/286 |
| 2007/0214769 A1* | 9/2007 | Fukuda et al. | ............... | 60/274 |

FOREIGN PATENT DOCUMENTS

| | | |
|---|---|---|
| EP | 1 375 877 A2 | 1/2004 |
| EP | 1 944 478 A1 | 7/2008 |

(Continued)

OTHER PUBLICATIONS

International Search Report issued in International Application No. PCT/IB2008/003388 on Apr. 6, 2009.

(Continued)

*Primary Examiner* — Binh Q Tran
*Assistant Examiner* — Matthew T Largi
(74) *Attorney, Agent, or Firm* — Oliff & Berridge, PLC

(57) ABSTRACT

In an exhaust gas purification device for an internal combustion engine, unburned fuel components are not supplied to a catalyst to make the atmosphere around the catalyst lean during a first lean period, unburned fuel components are supplied to the catalyst to make the atmosphere around the catalyst rich during a rich period, and the supply of unburned fuel components to the catalyst is again stopped during a second lean period. The first lean period, the rich period, and the second lean period form a cycle. If the actual amount of unburned fuel components added to the catalyst is below a required addition amount when a cycle ends, the duration of the first lean period in a subsequent cycle is reduced.

12 Claims, 13 Drawing Sheets

FOREIGN PATENT DOCUMENTS

| | | |
|---|---|---|
| EP | 2 020 488 A1 | 2/2009 |
| JP | A-2005-337039 | 12/2005 |
| JP | A-2007-127022 | 5/2007 |
| JP | A-2007-315225 | 12/2007 |
| WO | WO 2005/116431 A1 | 12/2005 |

OTHER PUBLICATIONS

Written Opinion issued in International Application No. PCT/IB2008/003388 on Apr. 6, 2009.

* cited by examiner

F I G . 1
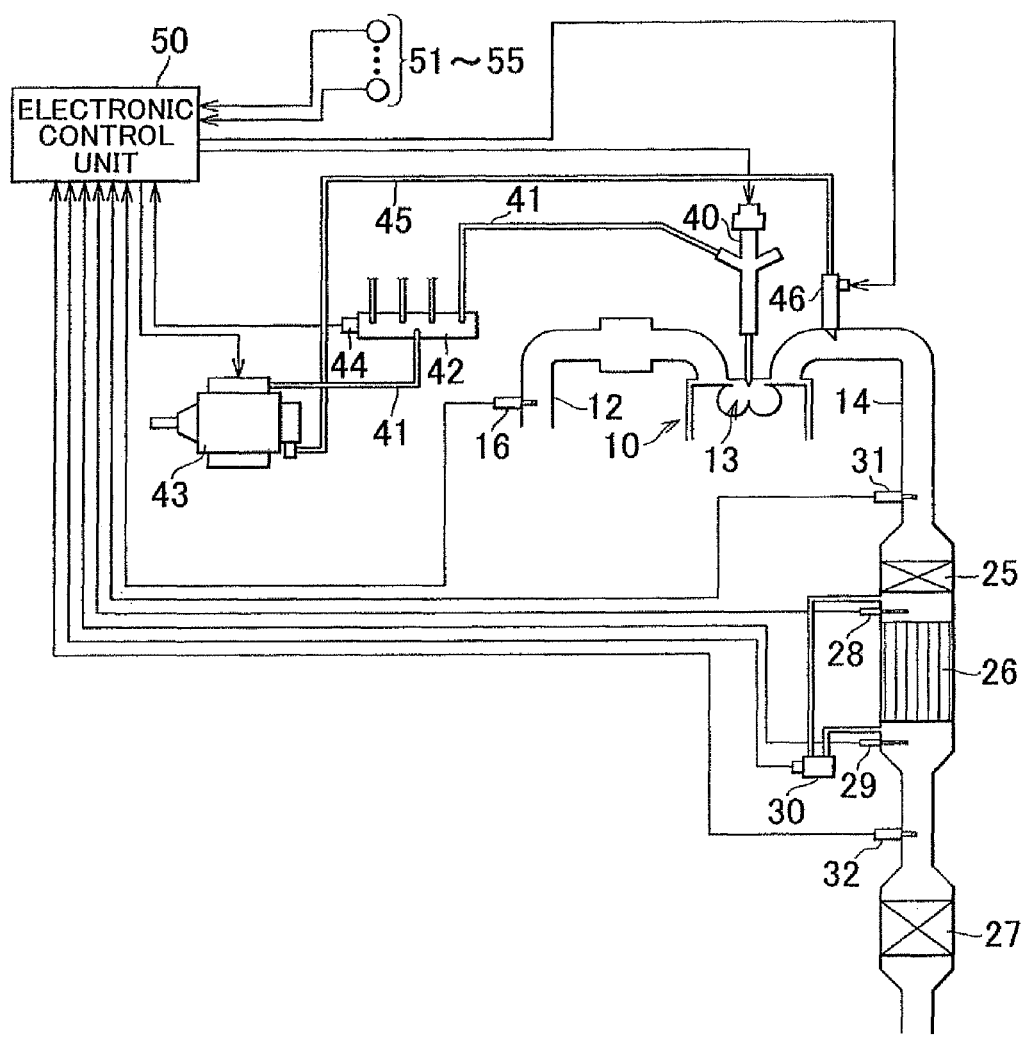

EXHAUST GAS PURIFICATION DEVICE FOR INTERNAL COMBUSTION ENGINE AND METHOD OF CONTROLLING THE EXHAUST GAS PURIFICATION DEVICE

BACKGROUND OF THE INVENTION

1. Field of the Invention

The invention relates to an exhaust gas purification device for an internal combustion engine and a method of controlling the exhaust gas purification device.

2. Description of the Related Art

Conventionally, there is known an exhaust gas purification device applied to an internal combustion engine such as a diesel engine mounted on a vehicle or the like, with an exhaust system provided with a PM filter for collecting particulate matters (PM) mainly composed of soot and a catalytic converter having carried thereon an occlusion/reduction type NOx catalyst for carrying out the purification of exhaust gas as to nitrogen oxides (NOx). In this exhaust gas purification device, with a view to recovering the capacity to purify exhaust gas, control for raising the average of a catalyst bed temperature to a target bed temperature through the supply of unburned fuel components to the catalyst is executed.

For example, in the NOx catalyst, the capacity to occlude NOx decreases due to the occlusion of sulfur components such as sulfur oxides and the like. Thus, in the exhaust gas purification device, with a view to recovering the NOx occlusion capacity of the NOx catalyst that has decreased through the occlusion of sulfur components, the sulfur poisoning recovery control for discharging sulfur components from the NOx catalyst is periodically executed. In this control, the average of the catalyst bed temperature of the NOx catalyst is raised to a target bed temperature of about 600 to 700° C. through the supply of unburned fuel components to the NOx catalyst, and the atmosphere around the catalyst is put into a state during rich combustion (hereinafter referred to as the rich combustion atmosphere) in this high-temperature state. Thus, the discharge and reduction of sulfur components from the NOx catalyst are promoted to recover the NOx occlusion capacity.

However, in the sulfur poisoning recovery control, when the atmosphere around the NOx catalyst is continuously made the rich combustion atmosphere, the catalyst bed temperature may excessively rise as a result of the generation of heat through oxidation of unburned fuel components in the NOx catalyst. Thus, in the sulfur poisoning recovery control, a rich period when the atmosphere around the NOx catalyst is made the rich combustion atmosphere through the supply of unburned fuel components to the NOx catalyst and a lean period when the atmosphere around the NOx catalyst is put into a state during lean combustion by stopping the supply of unburned fuel components to the NOx catalyst are alternately repeated. Owing to this alternate repetition of the rich period and the lean period, the average of the catalyst bed temperature can be held at a high temperature of about 600 to 700° C. without causing an excessive rise in the catalyst bed temperature, and sulfur components can be discharged from the NOx catalyst during the rich period when the atmosphere around the catalyst is made the rich combustion atmosphere.

It is desirable to alternately repeat the rich period and the lean period in the sulfur poisoning recovery control as disclosed in, for example, Japanese Patent Application Publication No. 2005-337039 (JP-A-2005-337039) (paragraphs [0023] to [0040], FIGS. 4 and 5), with the intention of restraining the catalyst bed temperature from rising excessively. In this Japanese Patent Application Publication No. 2005-337039 (JP-A-2005-337039), a first lean period, a rich period, and a second lean period are set as a cycle, and the repetition of the rich period and the lean period in the sulfur poisoning recovery control is realized through the repetition of that cycle.

In the case where the rich period and the lean period are thus repeated, the lean period for restraining the catalyst bed temperature from rising excessively is set as the first lean period and the second lean period respectively before and after the rich period within the cycle when the catalyst bed temperature rises. Accordingly, the first lean period as part of the lean period for restraining the catalyst bed temperature from rising excessively elapses before the rich period when the catalyst bed temperature rises. In this case, the catalyst bed temperature can be more appropriately restrained from rising excessively than in the case where the lean period (the first lean period+the second lean period) for restraining the catalyst bed temperature from rising excessively is set after the rich period and the rich period and the lean period are set as a cycle.

This is because the lean period is unlikely to become insufficient by ensuring the first lean period before the rich period in the case where the cycle ends along the way after the lapse of the rich period. If the lean period (the first lean period+the second lean period) for restraining the catalyst bed temperature from rising excessively is set after the rich period to constitute a cycle, the catalyst bed temperature may rise excessively due to an increase in the insufficiency of the lean period in the case where the cycle ends along the way after the lapse of the rich period.

The repetition of the rich period and the lean period with the intention of raising the average of the catalyst bed temperature to the target bed temperature in Japanese Patent Application Publication No. 2005-337039 (JP-A-2005-337039) will now be described in detail. The repetition of the rich period and the lean period in Japanese Patent Application Publication No. 2005-337039 (JP-A-2005-337039) is executed for the sulfur poisoning recovery control, and realized through processes shown below by [1] to [7].

[1] A rich period is determined on the basis of an engine operation state, and a first lean period is determined on the basis of the rich period. [2] A required flow rate as a flow rate of supplied unburned fuel components needed to make the average of the catalyst bed temperature equal to a target bed temperature through the continuous supply of unburned fuel components to the NOx catalyst is calculated.

[3] A required fuel amount as a total amount of supplied unburned fuel components in supplying the unburned fuel components to the NOx catalyst at the required flow rate from a time point corresponding to the start of the first lean period is calculated. [4] The supply of unburned fuel components to the NOx catalyst is stopped during the first lean period, and unburned fuel components are supplied to the NOx catalyst at a flow rate higher than the required flow rate during the rich period after the lapse of the first lean period.

[5] An actual fuel amount as a total amount of unburned fuel components actually supplied to the NOx catalyst from a time point corresponding to the start of the rich period is calculated. [6] A time to a timing when the actual fuel amount becomes equal to or smaller than the required fuel amount after the lapse of the rich period is set as a second lean period, and the supply of unburned fuel components to the NOx catalyst is stopped during the second lean period.

[7] The required fuel amount and the actual fuel amount are reset to their initial values "0" respectively at a time point corresponding to the end of the second lean period. By repeatedly executing the foregoing processes [1] to [7], the repetition of the rich period and the lean period in the sulfur poisoning recovery control, namely, the repetition of a cycle composed of the first lean period, the rich period, and the second lean period is carried out.

As disclosed in Japanese Patent Application Publication No. 2005-337039 (JP-A-2005-337039), in the case where the first lean period, the rich period, and the second lean period are set as a cycle and this cycle is repeated, the rich period may decrease due to changes in the engine operation state during the rich period, and may end as a result. That is, in the case where the rich period that has decreased is shorter than the rich period that has already elapsed, the rich period ends at a time point corresponding to the decrease thereof. In this case, when the actual fuel amount, which increases during the rich period, has not reached the required fuel amount, which increases from the time point corresponding to the start of the first lean period, the second lean period started after the end of the rich period ends simultaneously with the end of the rich period on the basis of the process [6], and a transition to a subsequent cycle is made.

Accordingly, under the situation described above, the first lean period is ensured in a manner corresponding to the rich period that has not decreased yet, the rich period then ends in a period shorter than a period suited for the first lean period, and a cycle ends as a result. Therefore, in this cycle, the lean period (the first lean period) is too long with respect to the rich period. In a state where the lean period is thus too long with respect to the rich period, the amount of heat generated through oxidation of unburned fuel components in the NOx catalyst in raising the average of the catalyst bed temperature to the target bed temperature is insufficient. When this insufficiency of the amount of heat generation successively occurs in consecutive cycles, the average of the catalyst bed temperature may decrease with respect to the target bed temperature.

This problem arises almost commonly in executing other kinds of control for raising the average of the catalyst bed temperature to the target bed temperature as well as in raising the average of the catalyst bed temperature to the target bed temperature in the sulfur poisoning recovery control. Mentionable as concrete examples of the other kinds of control are filter regeneration control and the like. In filter regeneration control, the average of the catalyst bed temperature of a catalyst provided in an exhaust system is raised to a target bed temperature to eliminate the clogging of a PM filter with particulates.

SUMMARY OF THE INVENTION

The invention provides an exhaust gas purification device for an internal combustion engine and a method of controlling the exhaust gas purification device that can restrain the amount of heat generated through oxidation of unburned fuel components in an NOx catalyst in a cycle, which is composed of a first lean period, a rich period, and a second lean period, from becoming insufficient successively afterward when a similar insufficiency occurs at a time point corresponding to the end of the cycle.

In a first aspect of the invention, an exhaust gas purification device for an internal combustion engine includes a control portion that sets, a first lean period, a rich period, and a second period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and that repeats the cycle to raise an average of a catalyst bed temperature to a target bed temperature. In this exhaust gas purification device for the internal combustion engine, the control portion sets a duration of the rich period based on an engine operation state, sets a duration of the first lean period based on the duration of the rich period, calculates a required flow rate of unburned fuel components supplied to the catalyst to make the average of the catalyst bed temperature equal to the target bed temperature through continuous supply of the unburned fuel components to the catalyst, calculates a required fuel amount of the total unburned fuel components to be supplied to the catalyst at the required flow rate from a start of the first lean period, supplies unburned fuel components to the catalyst at a flow rate higher than the required flow rate during the rich period, calculates an actual fuel amount of unburned fuel components actually supplied to the catalyst from the start of the rich period, sets a period from when the rich period has ended to when the actual fuel amount becomes equal to or smaller than the required fuel amount as the second lean period, resets both the required fuel amount and the actual fuel amount to their initial values when the second lean period ends, and sets the duration of the first lean period in a subsequent cycle shorter than that is set based on the duration of the rich period if the actual fuel amount is below the required fuel amount when the cycle ends.

In some cases, when a decrease in the rich period is caused through changes in the engine operation state during the rich period, the rich period ends as a result, a condition for ending the second lean period (the actual fuel amount $\leq$ the required fuel amount or the like), which is started after the end of the rich period, is fulfilled, the second lean period ends simultaneously with the rich period, and a transition to a subsequent cycle is made as a result. In such cases, the first lean period is ensured in a manner corresponding to the rich period that has not decreased yet, the rich period then ends in a time shorter than a period suited for the first lean period, and the cycle ends as a result. Therefore, in this cycle, the lean period (the first lean period) is too long with respect to the rich period. As a result, when the amount of heat generated through oxidation of unburned fuel components in the NOx catalyst in raising the average of the catalyst bed temperature to the target bed temperature becomes insufficient and a similar insufficiency of the amount of heat generation successively occurs in a subsequent cycle, the average of the catalyst bed temperature may decrease with respect to the target bed temperature.

According to the foregoing configuration, if the actual fuel amount is below the required fuel amount at the time point corresponding to the end of the second lean period, the duration of the first lean period in the subsequent cycle is set shorter than that is set based on duration of the rich period. Thus, the amount of heat generated through oxidation of unburned fuel components in the NOx catalyst in the subsequent cycle is restrained from becoming insufficient.

That is, even when the rich period decreases due to changes in the engine operation state during the rich period in this cycle and the rich period and the second lean period end as a result to end the cycle, the lean period (the first lean period) is restrained from becoming too long with respect to the rich period in that cycle, to the maximum possible extent, due to the reduction of the first lean period. Thus, the amount of heat generated through oxidation of unburned fuel components in the NOx catalyst in raising the average of the catalyst bed temperature to the target bed temperature is restrained from becoming insufficient as a result of a state in which the first lean period is too long with respect to the rich period in the cycle.

Owing to the foregoing configuration, even when the actual fuel amount becomes smaller than the required fuel amount at the time point corresponding to the end of the second lean time in a predetermined cycle and the amount of heat generated through oxidation of unburned fuel components in the NOx catalyst becomes insufficient in this cycle, a similar insufficiency of the amount of heat generation is restrained from successively occurring in a subsequent cycle. Accordingly, the average of the catalyst bed temperature is restrained from falling below the target bed temperature due to the succession of the insufficiency of the amount of heat generation in consecutive cycles.

In the first aspect of the invention, the control portion may set the duration of the first lean period in a subsequent cycle to "0" if the actual fuel amount is below the required fuel amount when the cycle ends.

According to the foregoing configuration, when the actual fuel amount is insufficient with respect to the required fuel amount at the time point corresponding to the end of the second lean period, the first lean period in the subsequent the cycle is reduced to "0". Therefore, the rich period is started simultaneously with the start of that cycle. In this case, when the rich period decreases due to changes in the engine operation state during the rich period, the actual fuel amount is larger than the required fuel amount at the time point corresponding to the end of the rich time that has decreased. This is because both the required fuel amount and the actual fuel amount increase respectively from their initial values simultaneously with the start of the cycle (the start of the rich period) and the actual fuel amount is more rapidly increased than the required fuel amount. Accordingly, when the rich period ends, the second lean period lasts until the required fuel amount increases to become equal to the actual fuel amount, which stops increasing at the time point corresponding to the end of the rich period. This second lean period has a length suited for the rich period. Therefore, the lean period (the second lean period) does not become too long with respect to the rich period in the cycle. Owing to the foregoing configuration, in the cycle, the amount of heat generated through oxidation of unburned fuel components in the NOx catalyst in raising the average of the catalyst bed temperature to the target bed temperature is appropriately restrained from becoming insufficient.

In the first aspect of the invention, the control portion may calculate a reduction amount by which to reduce the duration of the first lean period in the subsequent cycle based on the amount by which the actual fuel amount is below the required fuel amount and sets the duration of the first lean period in a subsequent cycle shorter than that is set based on the duration of the rich period by the reduction amount if the actual fuel amount is below the required fuel amount when the cycle ends.

According to the foregoing configuration, the reduction amount of the duration of the first lean period in the subsequent cycle is calculated based on the amount by which the actual fuel amount is below the required fuel amount at the time point corresponding to the end of the second lean period, and the duration of the first lean period is reduced by the reduction amount. Therefore, the duration of the first lean period can be reduced by an optimal amount in the subsequent cycle.

In a second aspect of the invention, an exhaust gas purification device for an internal combustion engine includes a control portion that sets, a first lean period, a rich period, and a second period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and that repeats the cycle to raise an average of a catalyst bed temperature to a target bed temperature. In this exhaust gas purification device for the internal combustion engine, the control portion sets a duration of the rich period based on an engine operation state, sets a duration of the first lean period based on the duration of the rich period, calculates a required flow rate of unburned fuel components supplied to the catalyst to make the average of the catalyst bed temperature equal to the target bed temperature through continuous supply of the unburned fuel components to the catalyst, calculates a required fuel amount of the total unburned fuel components to be supplied to the catalyst at the required flow rate from a start of the first lean period, supplies unburned fuel components to the catalyst at a flow rate higher than the required flow rate during the rich period, calculates an actual fuel amount of unburned fuel components actually supplied to the catalyst from the start of the rich period, sets a period from when the rich period has ended to when the actual fuel amount becomes equal to or smaller than the required fuel amount as the second lean period, resets both the required fuel amount and the actual fuel amount to their initial values when the second lean period ends, and executes a requirement increasing process to increase at least one of the required flow rate and the initial value of the required fuel amount in a subsequent cycle by an amount equal to a difference between the actual fuel amount and the required fuel amount if the actual fuel amount is below the required fuel amount when the cycle ends.

In some cases, when a decrease in the rich period is caused through changes in the engine operation state during the rich period, the rich period ends as a result, a condition for ending the second lean period (the actual fuel amount≦the required fuel amount or the like), which is started after the end of the rich period, is fulfilled, the second lean period ends simultaneously with the rich period, and a transition to a subsequent cycle is made as a result. In such cases, the first lean period is ensured in a manner corresponding to the rich period that has not decreased yet, and the rich period then ends in a time shorter than a period suited for the first lean period, so that a cycle ends. Therefore, in this cycle, the lean period (the first lean period) is too long with respect to the rich period. As a result, when the amount of heat generated through oxidation of unburned fuel components in the NOx catalyst in raising the average of the catalyst bed temperature to the target bed temperature becomes insufficient and a similar insufficiency of the amount of heat generation successively occurs in a subsequent cycle, the average of the catalyst bed temperature may decrease with respect to the target bed temperature.

According to the foregoing configuration, if the actual fuel amount is below the required fuel amount at the time point corresponding to the end of the second lean time, at least one of the required flow rate and the initial value of the required fuel amount in the subsequent cycle is increased by an amount equal to a difference between the actual fuel amount and the required fuel amount. Thus, the amount of heat generated through oxidation of unburned fuel components in the NOx catalyst in the subsequent cycle is restrained from becoming insufficient.

That is, when the required flow rate is made higher than a calculated value in this cycle, the required fuel amount, which is increased from the time point corresponding to the start of the first lean period, rapidly increases, and the time to a timing when the required fuel amount becomes equal to the actual fuel amount after the lapse of the rich period, namely, the second lean time decreases. Thus, in the cycle, the lean period (the first lean period+the second lean period) can be made shorter than the rich period. Further, when the initial value of the required fuel amount is made larger than usual in the cycle, the timing when the required fuel amount becomes equal to the actual fuel amount after the lapse of the rich time is advanced correspondingly, and the period (equivalent to the second lean period) to the timing when the required fuel amount becomes equal to the actual fuel amount after the lapse of the rich period decreases correspondingly. Thus, in the cycle, the lean period (the first lean period+the second lean period) can be made shorter than the rich period. By making the lean period shorter than the rich period in the cycle as described above, the amount of heat generated through oxidation of unburned fuel components in the NOx catalyst in raising the average of the catalyst bed temperature to the target bed temperature is restrained from becoming insufficient.

Owing to the foregoing configuration, even when the actual fuel, amount becomes smaller than the required fuel amount at the time point corresponding to the end of the second lean period in a predetermined cycle and the amount of heat generated through oxidation of unburned fuel components in the NOx catalyst becomes insufficient in this cycle, a similar insufficiency of the amount of heat generation is restrained from successively occurring in a subsequent cycle. Accordingly, the average of the catalyst bed temperature is restrained from decreasing with respect to the target bed temperature due to the succession of the insufficiency of the amount of heat generation in consecutive cycles. Furthermore, the lean period is made shorter than the rich period in the cycle subsequent to a cycle in which the amount of heat generation becomes insufficient. Thus, the insufficiency of the amount of heat generated through oxidation of unburned fuel components in the NOx catalyst in raising the average of the catalyst bed temperature to the target bed temperature in the previous cycle can be compensated for as well.

In the second aspect of the invention, the control portion may set the duration of the first lean period based on the duration of the rich period and the required flow rate, and increases the required flow rate in a subsequent the cycle by an amount equal to the difference between the actual fuel amount and the required fuel amount in the requirement increasing process if the actual fuel amount is below the required fuel amount when the cycle ends.

According to the foregoing configuration, if the required flow rate is increased in the subsequent cycle, the duration of the first lean period in the cycle may be reduced correspondingly. By thus reducing the first lean period, the following effect is obtained even if the duration of the rich period is reduced afterward due to changes in the engine operation state during the rich period and the transition to a subsequent cycle is made with the second lean period unable to be ensured. That is, the deficiency in the amount of heat generated through oxidation of unburned fuel components in the NOx catalyst in raising the average of the catalyst bed temperature to the target bed temperature may be held small at the time point corresponding to the end of the cycle with the required flow rate increased.

In the second aspect of the invention, the control portion may accumulate the difference between the actual fuel amount and the required fuel amount as an accumulated difference, increases at least one of the required flow rate and the initial value of the required fuel amount in a subsequent cycle by an amount equal to the accumulated difference in the requirement increasing process if the actual fuel amount is below the required fuel amount when the cycle ends, execute an upper limit guard process based on a guard value to avoid a breakdown of control for raising the average of the catalyst bed temperature to the target bed temperature due to the execution of the requirement increasing process, reset the accumulated difference to "0" after execution of the requirement increasing process if the upper limit guard process is not executed, and set a decrease in the accumulated difference resulting from the upper limit guard process as the accumulated difference after execution of the requirement increasing process if the upper limit guard process is executed.

According to the foregoing configuration, the requirement increasing process is executed. That is, the difference between the actual fuel amount and the required fuel amount at the time point corresponding to the end of the second lean period is accumulated as the accumulated difference, and at least one of the required flow rate and the initial value of the required fuel amount in the subsequent cycle is increased by the accumulated difference. The difference between the actual fuel amount and the required fuel amount is thereby compensated for in that cycle. However, when the accumulated difference becomes too large, the control for raising the average of the catalyst bed temperature to the target bed temperature breaks down. In order to avoid the breakdown of the control, the upper limit guard process for the accumulated difference based on the guard value is executed. Then, when the upper limit guard process for the accumulated difference is executed, the decrease in the accumulated difference resulting from the upper limit guard is set as the accumulated difference after execution of the requirement increasing process. Furthermore, at least one of the required flow rate and the initial value of the required fuel amount is increased in the subsequent cycle. Owing to the foregoing configuration, the insufficiency of the actual fuel amount with respect to the required fuel amount can be appropriately compensated for in the subsequent cycle or the later cycle while restraining the control for raising the average of the catalyst bed temperature to the target bed temperature from breaking down due to an excessive increase in the accumulated difference.

In a third aspect of the invention, a method of controlling an exhaust gas purification device for an internal combustion engine includes setting, a first lean period, a rich period, and a second period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and repeating the cycle to raise an average of a catalyst bed temperature to a target bed temperature; setting a duration of the rich period based on an engine operation state and setting a duration of the first lean period based on the duration of the rich period; calculating a required flow rate of unburned fuel components supplied to the catalyst to make the average of the catalyst bed temperature equal to the target bed temperature through continuous supply of the unburned fuel components to the catalyst; calculating a required fuel amount of the total unburned fuel components to be supplied to the catalyst at the required flow rate from a start of the first lean period; supplying unburned fuel components to the catalyst at a flow rate higher than the required flow rate during the rich period; calculating an actual fuel amount of unburned fuel components actually supplied to the catalyst from the start of the rich period; setting a period from when the rich period has ended to when the actual fuel amount becomes equal to or smaller than the required fuel amount as the second lean period and resetting both the required fuel amount and the actual fuel amount to their initial values when the second lean period ends; and setting the duration of the first lean period in a subsequent cycle shorter than that is set based on the duration of the rich period if the actual fuel amount is below the required fuel amount when the cycle ends.

In a fourth aspect of the invention, a method of controlling an exhaust gas purification device for an internal combustion engine includes setting, a first lean period, a rich period, and a second lean period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped; repeating the cycle to raise an average of a catalyst bed temperature to a target bed temperature; setting a duration of the rich period based on an engine operation state and setting a duration of the first lean period based on the duration of the rich period; calculating a required flow rate of unburned fuel components supplied to the catalyst to make the average of the catalyst bed temperature equal to the target bed temperature through continuous supply of the unburned fuel components to the catalyst; calculating a required fuel amount of the total unburned fuel components to be supplied to the catalyst at the required flow rate from a start of the first lean period; supplying unburned fuel components to the catalyst at a flow rate higher than the required flow rate during the rich period; calculating an actual fuel amount of unburned fuel components actually supplied to the catalyst from the start of the rich period; setting a period from when the rich period has ended to when the actual fuel amount becomes equal to or smaller than the required fuel amount as the second lean period and resetting both the required fuel amount and the actual fuel amount to their initial values when the second lean period ends; and executing a requirement increasing process to increase at least one of the required flow rate and the initial value of the required fuel amount in a subsequent cycle by an amount equal to a difference between the actual fuel amount and the required fuel amount if the actual fuel amount is below the required fuel amount when the cycle ends.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 1 is a schematic view showing an entire internal combustion engine to which an exhaust gas purification device according to the first embodiment of the invention is applied;

DETAILED DESCRIPTION OF EMBODIMENTS

Figure 2:
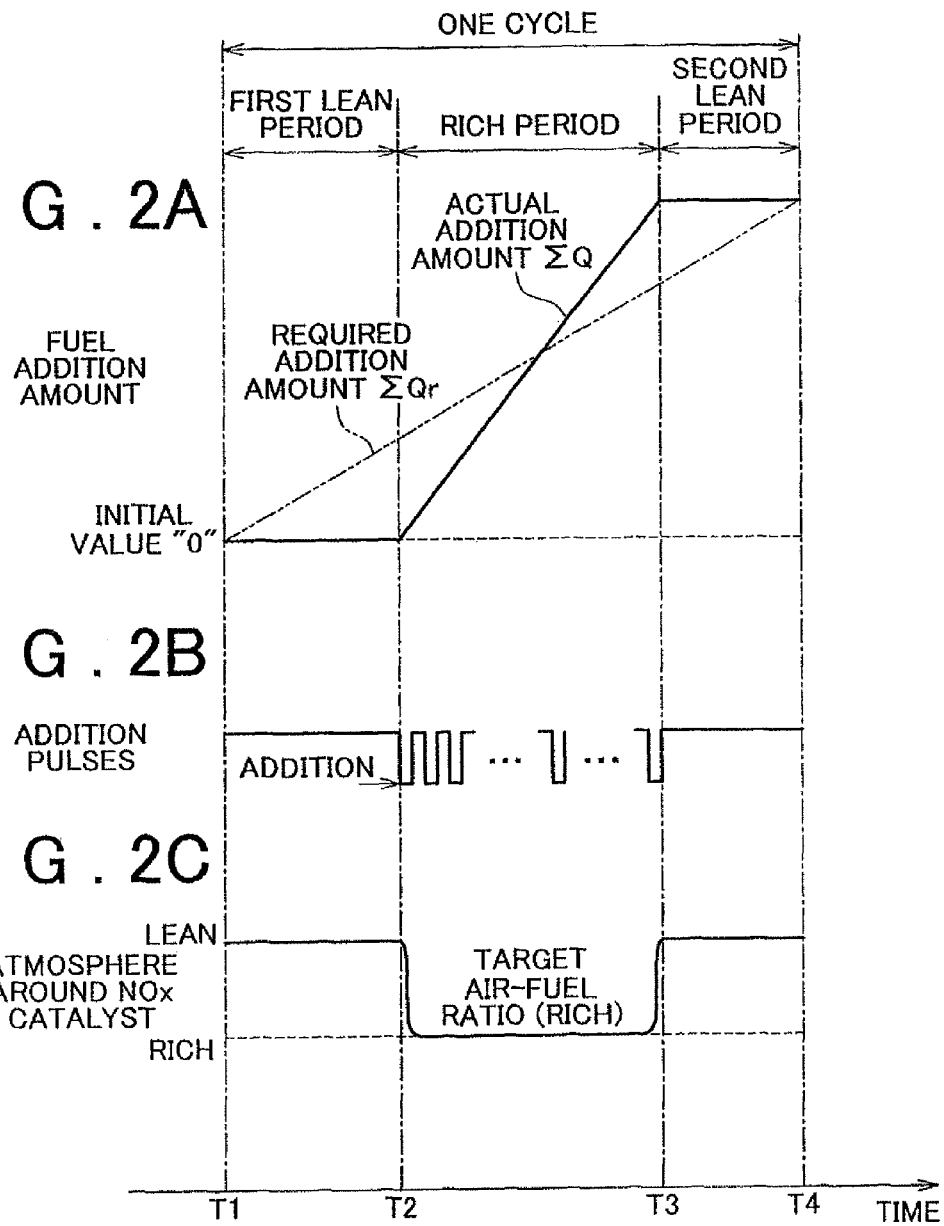
FIGS. 2A to 2C are time charts showing transitions of the actual fuel addition amount (actual addition amount) and a required value of the fuel addition amount (required addition amount), changes in addition pulses for driving an addition valve, and changes in an atmosphere around an NOx catalyst during the sulfur poisoning recovery control.

The first embodiment in which the invention is applied to an internal combustion engine for an automobile will be described hereinafter with reference to FIGS. 1 to 6.

FIG. 1 shows the configuration of an internal combustion engine 10 to which an exhaust gas purification device according to the first embodiment of the invention is applied. The internal combustion engine 10 is a diesel engine equipped with a common rail fuel injection unit.

An intake passage 12 that constitutes an intake system of the internal combustion engine 10 and an exhaust passage 14 that constitutes an exhaust system of the internal combustion engine 10 are connected to a combustion chamber 13 of each cylinder in the internal combustion engine 10. The intake passage 12 is provided with an airflow meter 16, and the exhaust passage 14 is provided with an NOx catalytic converter 25, a PM filter 26, and an oxidation catalytic converter 27, which are arranged in the stated order from the upstream side to the downstream side of the exhaust passage 14.

An occlusion/reduction type NOx catalyst is carried on the NOx catalytic converter 25. The NOx catalyst occludes NOx in exhaust gas when the concentration of oxygen in exhaust gas is high, and discharges the occluded NOx when the concentration of oxygen in exhaust gas is low. Further, the NOx catalyst reduces the discharged NOx as it discharges NOx when a sufficient, amount of unburned fuel components, serving as a reducer, are around the NOx catalyst.

The PM filter 26 is formed of a porous material, and is collects particulate matter (PM), mainly composed of soot, from exhaust gas. As is the case with the NOx catalytic converter 25, the PM filter 26 also carries an occlusion/reduction type NOx catalyst for purifying NOx in exhaust gas. Further, the PM filter 26 is also oxidizes and remove the accumulated PM through a reaction induced by the NOx catalyst.

An oxidation catalyst is carried on the oxidation catalytic converter 27. The oxidation catalyst oxidizes hydrocarbons (HC) and carbon monoxide (CO) in exhaust gas. A temperature sensor 28 that detects the temperature of exhaust gas downstream of the NOx catalytic converter 25 and a temperature sensor 29 that detects the temperature of exhaust gas that has passed through the PM filter 26 are disposed in the exhaust passage 14 upstream and downstream of the PM filter 26, respectively. Further, a differential pressure sensor 30 that detects the pressure differential between the exhaust gas upstream of the PM filter 26 and the exhaust gas downstream of the PM filter 26 is disposed in the exhaust passage 14. Furthermore, two air-fuel ratio sensors 31 and 32 are disposed in the exhaust passage 14 upstream of the NOx catalytic converter 25, and between the PM filter 26 and the oxidation catalytic converter 27, respectively.

A fuel injector 40 that injects fuel into the combustion chamber 13 of each cylinder of the internal combustion engine 10 is disposed in each cylinder. The fuel injector 40 in each cylinder is connected to a common rail 42 via a high-pressure fuel supply pipe 41. High-pressure fuel is supplied to the common rail 42 via a fuel pump 43. The pressure of high-pressure fuel in the common rail 42 is detected by a rail pressure sensor 44 fitted to the common rail 42. Furthermore, low-pressure fuel is supplied from the fuel pump 43 to an addition valve 46 through a low-pressure fuel supply pipe 45.

Various controls of the internal combustion engine 10 are executed by an electronic control unit 50. The electronic control unit 50 includes a CPU for executing various calculation processes regarding engine control, a ROM in which programs and data necessary for the control are stored, a RAM in which a calculation result of the CPU and the like are temporarily stored, input/output ports for inputting/outputting signals from/to the outside, and the like.

In addition to the respective sensors described above, an engine speed sensor 51 for detecting the engine rotational speed, an accelerator sensor 52 for detecting the accelerator operation amount, an intake air temperature sensor 54 for detecting the temperature of intake air in the internal combustion engine 10, a coolant temperature sensor 55 for detecting the temperature of coolant in the internal combustion engine 10, and the like are connected to the input port of the electronic control unit 50. Further, drive circuits for the injector 40, the fuel pump 43, the addition valve 46, and the like are connected to the output port of the electronic control unit 50.

The electronic control unit 50 outputs command signals to the drive circuits for the respective components connected to the output port, in accordance with an engine operation state determined from the signals sent by the respective sensors. Thus, various controls, such as the control of the amount of fuel injection, the timing for fuel injection, and the pressure of fuel injection regarding the fuel injected from the fuel injector 40, the control of the addition of fuel from the addition valve 46, and the like are executed by the electronic control unit 50.

In the embodiment of the invention configured as described above, a sulfur poisoning recovery control for recovering the NOx occlusion capacity of the NOx catalyst that has decreased due to the occlusion of sulfur components, such as sulfur oxides (SOx) and the like by the NOx catalyst, is executed. The execution of the sulfur poisoning recovery control is started when the amount of sulfur components occluded by the NOx catalyst (the sulfur poisoning amount S) becomes equal to or exceeds a threshold amount.

In the sulfur poisoning recovery control, the temperature of the NOx catalyst is increased to, for example, about 600 to 700° C. by supplying unburned fuel components to the NOx catalyst, and the atmosphere around the NOx catalyst is put into a state when rich combustion is executed (hereinafter referred to as the rich combustion atmosphere). The discharge and reduction of sulfur components from the NOx catalyst are thereby promoted. As a result, the NOx occlusion capacity of the NOx catalyst is recovered. In the sulfur poisoning recovery control, the unburned fuel components may be supplied to the NOx catalyst by, for example, adding fuel to exhaust gas from the addition valve 46.

Then, when the sulfur poisoning amount S decreases to a predetermined value (e.g., "0") below than the threshold amount through the execution of the sulfur poisoning recovery control, the sulfur poisoning recovery control is ended. Next, the sulfur poisoning recovery control, which is started/ended on the basis of the sulfur poisoning amount S, will be described in detail with reference to time charts of FIG. 2.

In the sulfur poisoning recovery control, the average catalyst bed temperature of the NOx catalyst is increased to a target bed temperature, which is gradually raised to, for example, 700° C., by supplying unburned fuel components to the NOx catalyst through the addition of fuel from the addition valve 46. Under the high-temperature state, the atmosphere around the NOx catalyst is made the rich combustion atmosphere.

Fuel is added from the addition valve 46 by driving the addition valve 46 according to addition pulses shown in FIG. 2B. However, when the atmosphere around the NOx catalyst is continuously made the rich combustion atmosphere through the addition of fuel from the addition valve 46, the temperature increase in the catalyst bed temperature may become excessive due to the generation of heat through the oxidation of unburned fuel components in the NOx catalyst. Thus, in the sulfur poisoning recovery control, a lean time when the addition of fuel from the addition valve 46 is stopped to put the atmosphere around the NOx catalyst into a state when lean combustion is executed and a rich time when fuel is added from the addition valve 46 to put the atmosphere around the NOx catalyst into a state when rich combustion is executed (the rich combustion atmosphere) are alternately repeated.

More specifically, the addition of fuel from the addition valve 46 is stopped until a first lean time (T1 to T2 in FIGS. 2A to 2C) has elapsed, and fuel is added from the addition valve 46 upon a subsequent transition to a rich time (T2 to T3). Furthermore, a transition to a second lean time (T3 to T4) occurs after the rich time (T2 to T3) has elapsed, and the addition of fuel from the addition valve 46 is stopped during the second lean time. In the sulfur poisoning recovery control, the first lean time, the rich time, and the second lean time are set as a cycle. Due to the repetition of these times, the rich time (T2 to T3) and the lean time (T1 to T2 and T3 to T4) are repeated. Thus, the average catalyst temperature may be maintained at about 600 to 700° C. without excessively raising the catalyst bed temperature. The atmosphere around the NOx catalyst is made the rich combustion atmosphere during the rich period as shown in FIG. 2C, to discharge sulfur components from the NOx catalyst.

One mode of setting the first lean period, the rich period, and the second lean period as described above in the sulfur poisoning recovery control will now be described in detail. In the sulfur poisoning recovery control, at a time point (T1) corresponding to the start of the first lean period, the rich period is set based on the engine load and the engine rotational speed such that the generation of white smoke in exhaust gas of the internal combustion engine 10 is suppressed. The engine load is calculated based on, for example, the amount of fuel injected from the injector 40, and the engine rotational speed is calculated based on the detection signal from the NE sensor 51.

After the rich period is set, the first lean period is set based on a later-described required addition flow rate Qt (mm3/sec), a later-described necessary total addition amount Qrich (mm3), and a later-described cycle period Tint (sec), as well as the set rich period.

The required addition flow rate Qt (required flow rate) is the fuel amount per unit time that is needed to make the catalyst bed temperature equal to the target bed temperature on the assumption that fuel is continuously added from the addition valve 46. The required addition flow rate Qt is calculated at predetermined intervals (e.g., 16 ms) based on the target bed temperature, the temperature of exhaust gas in the internal combustion engine 10, the flow rate of exhaust gas in the internal combustion engine 10, and the like. The temperature of exhaust gas in the internal combustion engine 10 may be calculated based on the detection signals of the temperature sensors 28 and 29, and the flow rate of exhaust gas in the internal combustion engine 10 may be calculated from the detection signal of the airflow meter 16.

The necessary total addition amount Qrich is the total amount of added fuel needed to make the atmosphere around the NOx catalyst the rich combustion atmosphere as a target during the set rich period. The necessary total addition amount Qrich is calculated based on the amount of intake air (fresh air amount) in the internal combustion engine 10, the amount of fuel injected from the injector 40, the target air-fuel ratio corresponding to the rich combustion atmosphere as the target, and the duration of the rich period. The amount of intake air in the internal combustion engine 10 is calculated based on the detection signal of the airflow meter 16, and the amount of fuel injected from the injector 40 is calculated based on the command value Qfin for a fuel injection amount in injecting fuel from the injector 40.

The cycle period is a value equivalent to a period from a time point corresponding to the start of the first lean period to a time point corresponding to the end of the second lean period through the first lean period, the rich period, and the second lean period. The cycle period Tint is obtained by dividing the necessary total addition amount Qrich by the required addition flow rate Qt. Accordingly, the cycle period Tint is equal to the period needed to obtain the necessary total addition amount Qrich by continuously adding fuel from the addition valve 46 such that the flow rate of fuel added from the addition valve 46 becomes equal to the required addition flow rate Qt.

The first lean period is set based on the cycle period Tint and the rich period, using the following expression:

"(first lean period)={(cycle period Tint)−(rich period)}·(3/5)"     (2)

The term "3/5" in this expression (2) is intended to determine how much of the interval other than the rich period in the cycle period Tint is to be allocated as the first lean period. In this example, "3/5" of the time other than the rich period in the cycle period Tint is allocated as the first lean period. The value "3/5" may also be changed to another value between "0" and "1". Further, as is apparent from expression (2), the first lean period is a value that is set to increase as the duration of the rich period increases.

After the start of the first lean period, a value obtained by multiplying the required addition flow rate Qt (mm$^3$/sec) calculated at predetermined timings (at intervals of 16 ms in this example) by a time between adjacent ones of those timings is accumulated, and a required addition amount ΣQr (mm$^3$) as a value obtained through this accumulation is calculated at each time the required addition flow rate Qt is calculated. The required addition amount ΣQr (required fuel amount) thus calculated increases with time as indicated by, for example, alternate long and two short dashes lines in FIG. 2A, with the time point (T1) as the start of the first lean period.

Further, the addition of fuel from the addition valve 46 is stopped during the period between the start of the first lean period to the end of the first lean period at time (T2). If the rich period starts after the first lean period has elapsed, fuel is added from the addition valve 46 based on the addition pulses shown in FIG. 2B. The flow rate in adding fuel from the addition valve 46 based on these addition pulses is higher than the calculated required addition flow rate Qt. That is, the length, interval, and the like of the addition pulses in the rich period are set based on the length or the like of the rich period such that the flow rate which is higher than the calculated required addition flow rate Qt is obtained.

After the rich period starts, the amount of fuel added from the addition valve 46 in the space of 16 ms is calculated every time 16 ms elapses after time (T2), which corresponds to the start of the rich period, and the calculated amount is accumulated to calculate an actual addition amount ΣQ (mm3) as a total amount of fuel added from the addition valve 46 during the rich time. The actual addition amount ΣQ (actual fuel amount) thus calculated increases over time as indicated by, for example, the solid line in FIG. 2A, with time (T2) serving as a base point.

Then, the addition of fuel from the addition valve 46 stops at time (T3), which corresponds to the end of the rich period, so that the actual addition amount ΣQ (the solid line in FIG. 2A) stops increasing. On the other hand, the required addition amount ΣQr increases with time as indicated by alternate long and two short dashes lines in FIG. 2A, but more gently than the actual addition amount ΣQ during the rich time. This is because the flow rate of fuel added from the addition valve 46 during the rich period is made higher than the required addition flow rate Qt. Accordingly, even if the actual addition amount ΣQ (=0) is smaller than the required addition amount ΣQr at time (T2), the actual addition amount ΣQ increases beyond the required addition amount ΣQr in the course of the rich period, and exceeds the required addition amount ΣQr by a substantial amount at time (T3).

After the rich period ends, while the actual addition amount ΣQ stops increasing because the addition of fuel from the addition valve 46 has stopped, the required addition amount ΣQr gradually increases and eventually coincides with the actual addition amount ΣQ. The coincidence between the required addition amount ΣQr and the actual addition amount ΣQ means that the addition of fuel from the addition valve 46 and the stoppage thereof have been carried out in just proportion to make the catalyst bed temperature equal to the target bed temperature during the cycle period Tint. Accordingly, a period from the time point (T3) corresponding to the end of the rich period to a time point (T4), which corresponds to the time when the actual addition amount ΣQ coincides with the required addition amount ΣQr, is set as the second lean period. The second lean period is set to increase as the duration of the rich period increases because the actual addition amount ΣQ at the time point corresponding to the end of the rich period increases as the rich period increases.

At time (T4) corresponding to the end of the second lean period, namely, at the time when the actual addition amount ΣQ coincides with the required addition amount ΣQr, the addition of fuel from the addition valve 46 and the stoppage thereof are carried out in just proportion to have the catalyst bed temperature equal to the target bed temperature during the cycle period Tint. Therefore, the required addition amount ΣQr and the actual addition amount ΣQ are reset to their initial values "0" respectively.

A cycle composed of the first lean period, the rich period, and the second lean period thus ends, and a subsequent cycle is started. Thus, the cycle composed of the first lean period, the rich period, and the second lean period is repeated. A determination that the cycle has ended, namely, a determination that the second lean period has ended is made on the basis of the fulfillment of, for example, a condition [a] that the rich period has ended and a condition [b] that the actual addition amount $\Sigma Q$ is equal to or smaller than the required addition amount $\Sigma Qr$.

Due to the repetition of the cycle, the average bed temperature of the catalyst is raised to the target bed temperature (600 to 700° C.) to maintain the NOx catalyst by a high temperature, and the atmosphere around the NOx catalyst is made the rich combustion atmosphere by adding fuel from the addition valve 46 during the rich time. Thus, the discharge and reduction of sulfur components from the NOx catalyst are promoted during the rich period, and the amount of occluded sulfur components in the NOx catalyst is reduced to recover the NOx occlusion capacity of the NOx catalyst. Then, when the sulfur poisoning amount S decreases to the predetermined value ("0" in this example), the sulfur poisoning recovery control is ended.

Figure 3:
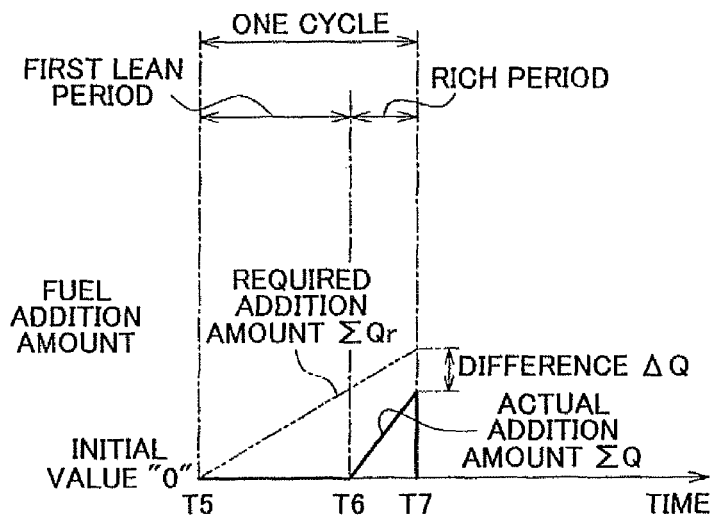
FIG. 3 is a time chart showing transitions of the required addition amount and the actual addition amount during a sulfur poisoning recovery control.

In the sulfur poisoning recovery control, when the first lean period, the rich period, and the second lean period are set as a cycle and this one cycle is repeated as described above, the duration of the rich period may be reset to decrease due to changes in the engine operation state during the rich period, and end as a result. That is, if the duration of rich period that has been reset to decrease due to changes in the engine operation state during the rich period is shorter than the rich period that has already elapsed, the rich period ends at time T7, as shown in FIG. 3, at the time point when the rich period is reset to decrease. At this moment, if the actual addition amount $\Sigma Q$, which increases during the rich period (T6 to T7), has not reached the required addition amount $\Sigma Qr$, which increases from the time point (T5), which corresponds to the start of the first lean period, the conditions [a] and [b] for determining that the cycle has ended are fulfilled. As a result, the second lean period ends simultaneously with the rich period, and a transition to a subsequent cycle.

Figure 4A:
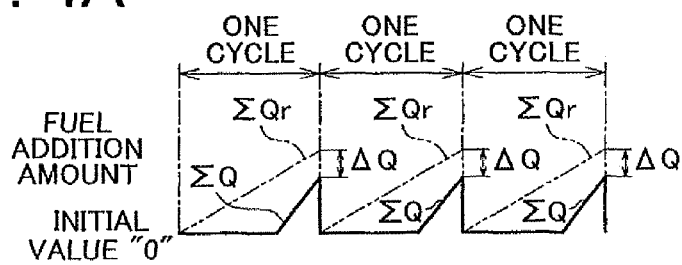
FIGS. 4A and 4B are time charts showing transitions of the required addition amount and the actual addition amount and a transition of an average of a catalyst bed temperature with respect to a target bed temperature during the sulfur poisoning recovery control.
Figure 4B:
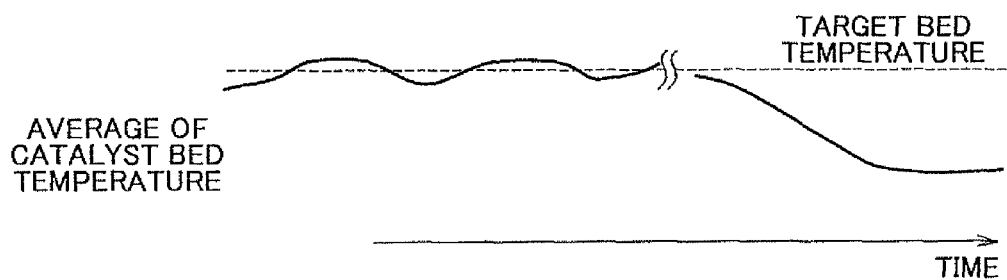
Figure 5:
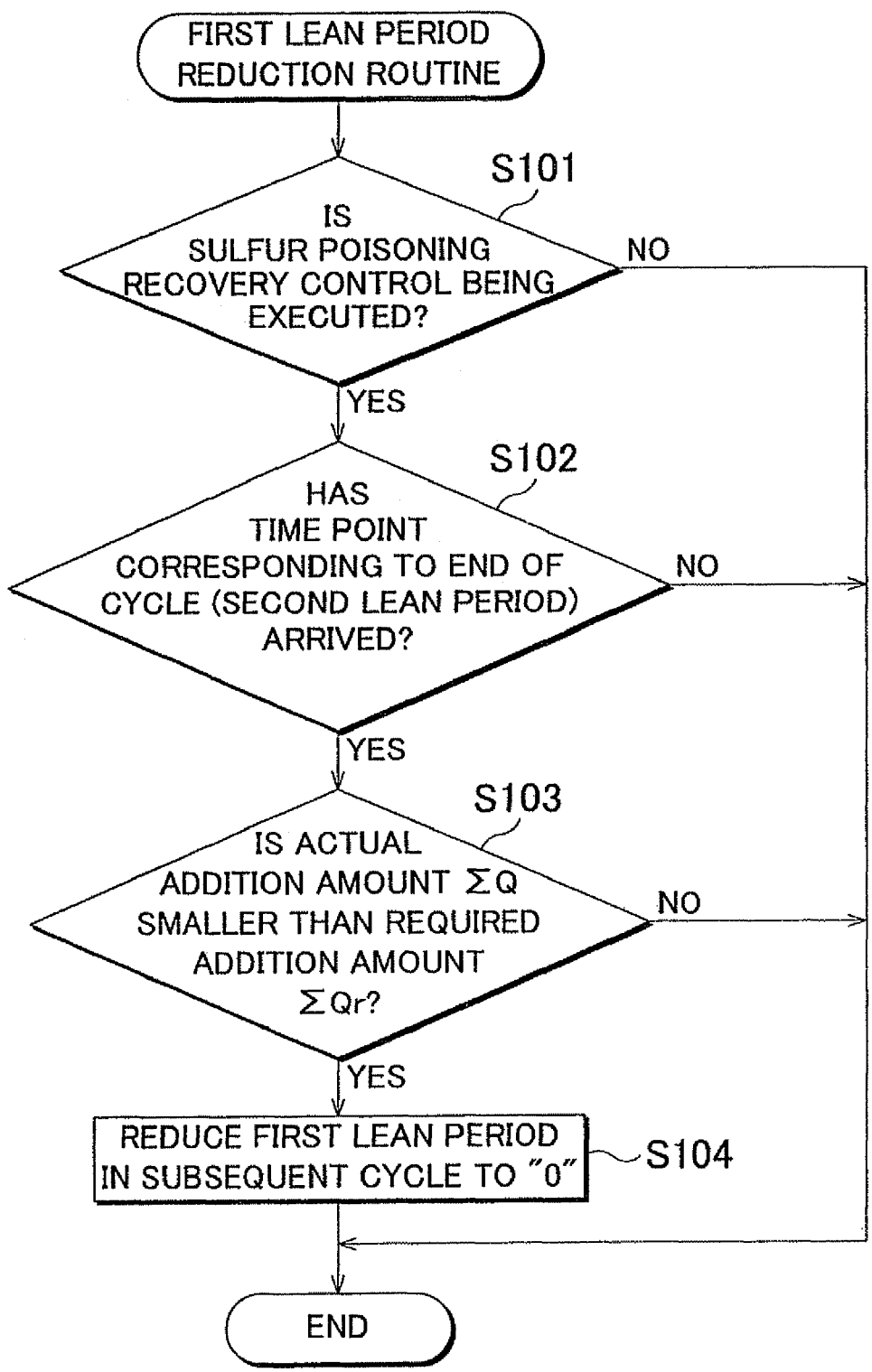
FIG. 5 is a flowchart showing a procedure of reducing a first lean time.

Accordingly, under the situation described above, the first lean period (T5 to T6) is ensured to the rich period before the rich period has been reset to decrease, and the rich period ends in a period (T6 to T7) which is shorter than the period suited for the first lean period, so that the cycle ends. Thus, in this cycle, the lean period (the first lean period) is too long with respect to the rich period. If the lean period is too long with respect to the rich period, the amount of heat generated through oxidation of unburned fuel components in the NOx catalyst in raising the average bed temperature of the catalyst to the target bed temperature is insufficient. The deficiency in the amount of heat generation in this case is a value corresponding to a difference $\Delta Q$ between the actual addition amount $\Sigma Q$ from the required addition amount $\Sigma Qr$ at the time point (T7), which corresponds to the end of the cycle. Then, when the deficiency in the amount of heat generation (corresponding to the difference $\Delta Q$) as described above successively occurs in consecutive cycles as shown in FIG. 4A, the average bed temperature of the catalyst indicated by a solid line in FIG. 4B may decrease with respect to the target bed temperature indicated by broken lines in FIG. 4B.

To cope with this inconvenience, in the first embodiment of the invention, when the actual addition amount $\Sigma Q$ is below the required addition amount $\Sigma Qr$ at the end of a cycle (the second lean period), the first lean period in a subsequent cycle is made shorter than a value determined based on the rich period or the like, using the expression (2). More specifically, the first lean period in the subsequent cycle is reduced to "0" according to a flowchart of FIG. 5, which shows a first lean period reduction routine.

This first lean period reduction routine is periodically executed through the electronic control unit 50, at predetermined intervals. In the routine, on the condition that a cycle (the second lean period) have just ended during the sulfur poisoning recovery control (YES in both S101 and S102), it is determined whether the actual addition amount $\Sigma Q$ is below the required addition amount $\Sigma Qr$ (S103). Then, if a positive determination is made in this step, the first lean period in a subsequent cycle, which has been calculated using the expression (2), is reduced to "0" (S104).

Figure 6:
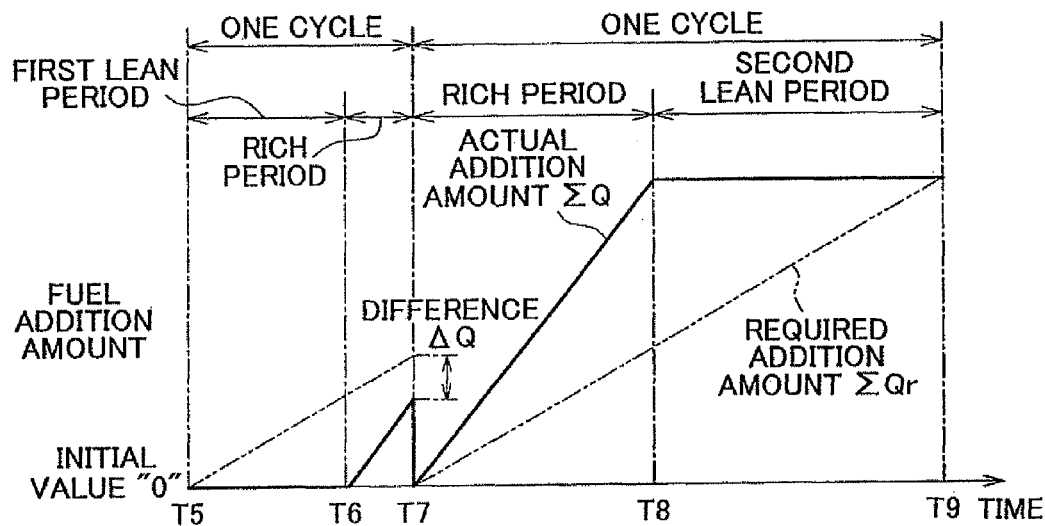
FIG. 6 is a time chart showing transitions of the required addition amount and the actual addition amount during the sulfur poisoning recovery control in the first embodiment of the invention.

Thus, as shown in FIG. 6, when the actual addition amount $\Sigma Q$ is below the required addition amount $\Sigma Qr$ at time (T7), the first lean period in a subsequent cycle is "0". Therefore, the rich period arrives simultaneously with the start of the subsequent cycle (T7). Then, both the required addition amount $\Sigma Qr$ and the actual addition amount $\Sigma Q$ increase from their initial values "0" simultaneously with the start of the subsequent cycle (the start of the rich period). In this case, the actual addition amount $\Sigma Q$ is more rapidly increased than the required addition amount $\Sigma Qr$. Then, when the rich period (T7 to T8) ends, the actual addition amount $\Sigma Q$ stops increasing, and a transition to the second lean period is made. When the required addition amount $\Sigma Qr$, which increases during the second lean period as well, reaches the actual addition amount $\Sigma Q$, the second lean period (T8 to T9) ends, so that the cycle ends.

In this case, if the rich period is shortened due to changes in the engine operation state during the rich period (T7 to T8) in the cycle, the actual addition amount $\Sigma Q$ will exceed the required addition amount $\Sigma Qr$ when the shortened rich period ends. Accordingly, when the shortened rich period ends, the second lean period lasts until the required addition amount $\Sigma Qr$ increases to become equal to the actual addition amount $\Sigma Q$, which stops increasing at the time point corresponding to the end of the rich period. The second lean period has a length suited for the rich period. Therefore, the lean period (the second lean period) does not become too long with respect to the rich period in the cycle. Thus, in the cycle, the amount of heat generated through oxidation of unburned fuel components in the NOx catalyst is appropriately restrained from becoming insufficient.

With the above described configuration, the actual addition amount $\Sigma Q$ is below the required addition amount $\Sigma Qr$ at the end of the second lean time (T7 in the example of FIG. 6) in a predetermined cycle, and even when the amount of heat generated through oxidation of unburned fuel components in the NOx catalyst becomes insufficient in this cycle, a similar insufficiency of the amount of heat generation is restrained from successively occurring in a later cycle. Accordingly, the average bed temperature of the catalyst is restrained from falling below the target bed temperature, which is indicated by the broken lines in FIG. 4B, as a result of the succession of the insufficiency of the amount of heat, generation as shown in FIG. 4A.

According to the first embodiment of the invention, the following effects are obtained. (1) Even if the actual addition amount $\Sigma Q$ falls below the required addition amount $\Sigma Qr$ when the predetermined cycle ends and the amount of heat generated through oxidation of unburned fuel components in the NOx catalyst becomes insufficient in the current cycle, a similar deficiency in the amount of heat generated is restrained from recurring in a subsequent cycle. Accordingly, the average bed temperature of the catalyst is restrained from falling below the target bed temperature as a result of the succession of the insufficiency of the amount of heat generation in consecutive cycles.

(2) If the actual addition amount $\Sigma Q$ falls below the required addition amount $\Sigma Qr$ when the predetermined cycle ends, the duration of the first lean period in a subsequent cycle is reduced to "0", so that the subsequent cycle starts in a rich period. In this case, if the duration of the rich period is shortened due to changes in the engine operation state during the rich period, the actual addition amount $\Sigma Q$ exceeds the required addition amount $\Sigma Qr$ when the shortened rich period ends. This is because both the required addition amount $\Sigma Qr$ and the actual addition amount $\Sigma Q$ simultaneously increase from their initial values "0" with the start of the cycle (the start of the rich period) and the actual addition amount $\Sigma Q$ is more rapidly increased than the required addition amount $\Sigma Qr$. Accordingly, when the rich period ends, the second lean period lasts until the required addition amount $\Sigma Qr$ increases to become equal to the actual addition amount $\Sigma Q$, which has stopped increasing at the end of the rich period. The second lean period has a duration suited for the rich period. Therefore, in the cycle, the lean period (the second lean period) does not become too long with respect to the rich period. Owing to the foregoing configuration, in the cycle, deficiencies in the amount of heat generated through oxidation of unburned fuel components in the NOx catalyst are appropriately restrained.

Figure 7:
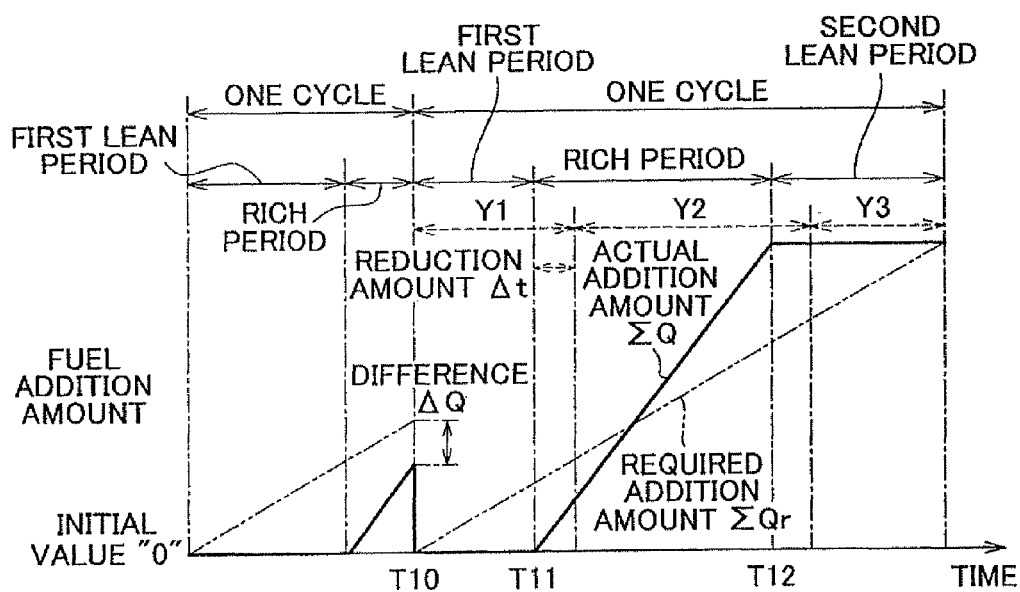
FIG. 7 is a time chart showing transitions of the required addition amount and the actual addition amount during the sulfur poisoning recovery control in a modified example of the first embodiment of the invention.

The first embodiment of the invention may also be modified, for example, as follows. As shown in FIG. 7, if the actual addition amount $\Sigma Q$ is smaller than the required addition amount $\Sigma Qr$ at time (T10), which corresponds to the end of a predetermined cycle, the duration of the first lean period in a subsequent cycle is reduced by a reduction amount At calculated based on the difference $\Delta Q$ between the actual addition amount $\Sigma Q$ and the required addition amount $\Sigma Qr$. Then, in the subsequent cycle, the duration of the first lean period (indicated by an broken arrow Y1), which is determined based on the rich period using expression (2), is reduced by the reduction amount $\Delta t$.

Broken arrows Y2 and Y3 in FIG. 7 denote the rich period and the second lean period respectively when the duration of the first lean period in a subsequent cycle is not reduced by the reduction amount $\Delta t$. As is apparent from the broken arrows Y1, Y2, and Y3 in FIG. 7, the rich period has the same duration in the subsequent cycle regardless of whether the first lean period is reduced by the reduction amount $\Delta t$. If the first lean period is reduced by the reduction amount $\Delta t$, the second lean period is increased correspondingly. Accordingly, even if the first lean period is reduced as described above, the ratio between the rich period and the total lean period does not usually change in the cycle.

However, if the duration of the rich period decreases due to changes in the engine operation state during the rich period (T11 to T12) and the rich period and the second lean period end at the time that the duration of the rich period is decreased, the lean period (the first lean period) is too long with respect to the rich period in that cycle. However, to restrain the lean period (the first lean period) exceeding the rich period excessively, the duration of the first lean period is reduced by the reduction amount $\Delta t$. Thus, the occurrence of deficiencies in the amount of heat generated through oxidation of unburned fuel components in the NOx catalyst as a result of a state where the first lean period becomes too long with respect to the rich period in the cycle is reduced.

Accordingly, in this case as well, an effect similar to the effect (1) is obtained. Further, based on the difference $\Delta Q$ between the actual addition amount $\Sigma Q$ and the required addition amount $\Sigma Qr$ at the end of a cycle, the reduction amount $\Delta t$ of the first lean period in a subsequent cycle is calculated. Therefore, the first lean period in the subsequent cycle is reduced by an optimal amount.

Figure 8:
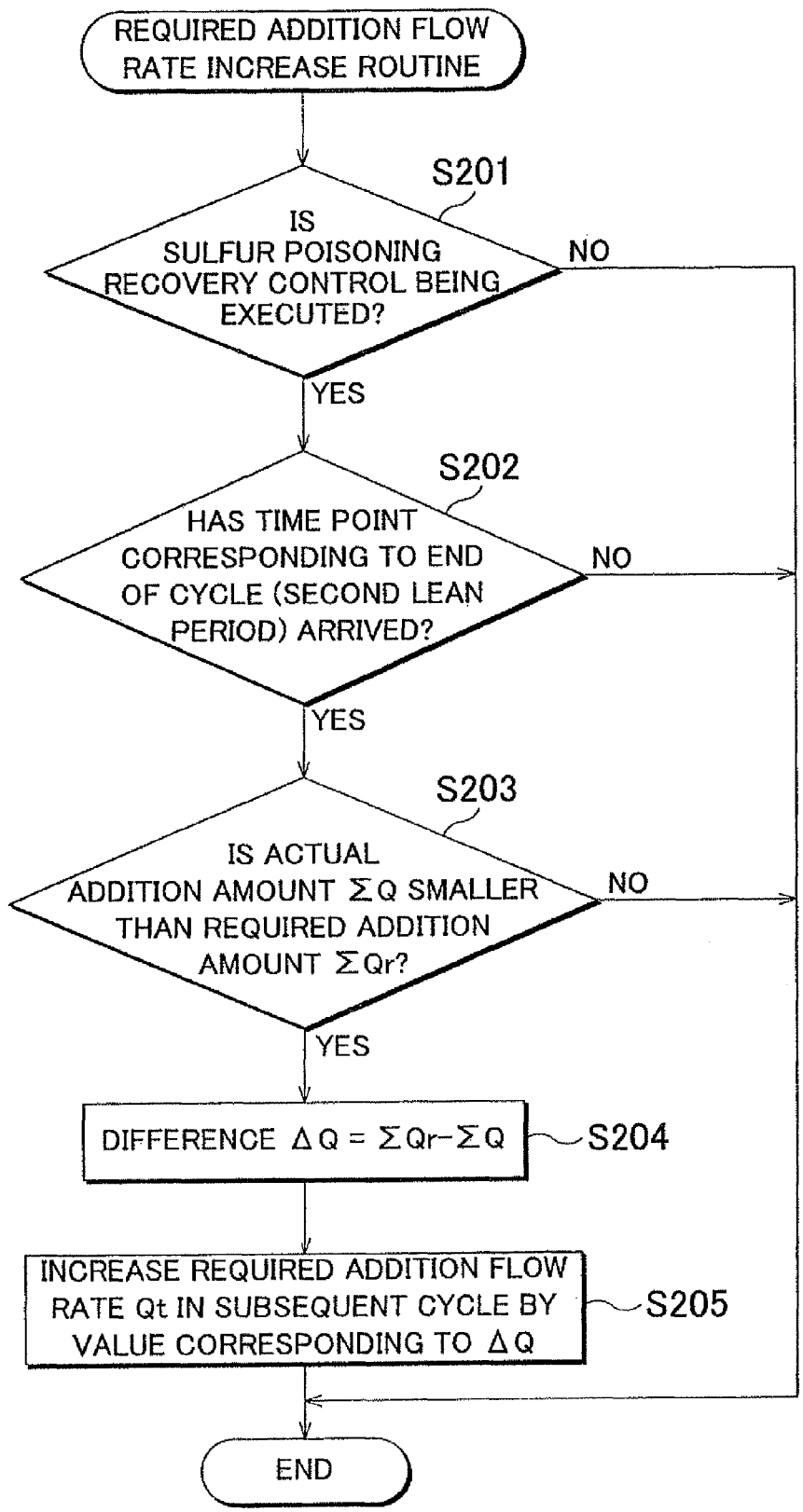
FIG. 8 is a flowchart showing a procedure of increasing a required addition flow rate.

Next, a second embodiment of the invention will be described on the basis of FIGS. 8 and 9. In the second embodiment of the invention, a requirement increasing process is executed. That is, if the actual addition amount $\Sigma Q$ is smaller than the required addition amount $\Sigma Qr$ at the end of the cycle, the required addition flow rate Qt is increased to exceed the required addition flow rate Qt calculated based on a target bed temperature, a temperature of exhaust gas in the internal combustion engine 10, a flow rate of exhaust gas in the internal combustion engine 10, and the like in a subsequent cycle. More specifically, the required addition flow rate Qt in the subsequent cycle is increased according to a flowchart of FIG. 8, which shows a required addition flow rate increasing routine.

This required addition flow rate increasing routine is periodically executed through the electronic control unit 50 at predetermined intervals. In this routine, on the condition that a cycle (the second lean period) has just ended during the sulfur poisoning recovery control (YES in both S201 and S202), it is determined whether the actual addition amount $\Sigma Q$ is smaller than the required addition amount $\Sigma Qr$ (S203). Then, if a positive determination is made in this step (S203), the difference $\Delta Q$ between the actual addition amount $\Sigma Q$ and the required addition amount $\Sigma Qr$ is the deficiency in the actual addition amount $\Sigma Q$ with respect to the required addition amount $\Sigma Qr$ (S204). Next, the required addition flow rate Qt in the subsequent cycle, which has been calculated on the basis of the target bed temperature, the temperature of exhaust gas in the internal combustion engine 10, the flow rate of exhaust gas in the internal combustion engine 10, and the like, is increased by the amount $\Delta Q$ (S205).

Figure 9:
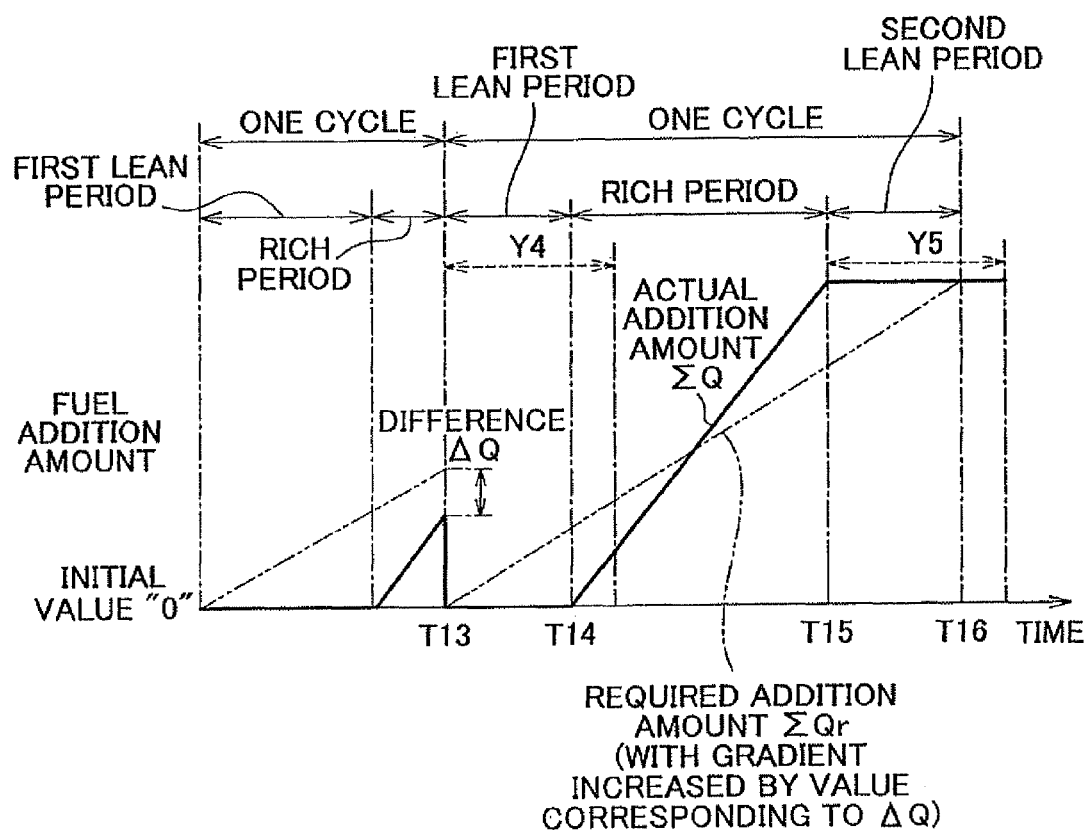
FIG. 9 is a time chart showing transitions of a required addition amount and an actual addition amount during the sulfur poisoning recovery control in the second embodiment of the invention.

Thus, as shown in FIG. 9, if the actual addition amount $\Sigma Q$ is smaller than the required addition amount $\Sigma Qr$ at time (T13), which corresponds to the end of a cycle, the required addition flow rate Qt in a subsequent cycle is increased by an amount to the difference $\Delta Q$ between the actual addition amount $\Sigma Q$ and the required addition amount $\Sigma Qr$. Therefore, the speed at which the required addition amount $\Sigma Qr$ is increased in the cycle (the gradient of alternate long and two short dashes lines in FIG. 9) increases. If the required addition flow rate Qt thus increases, the cycle period Tint, which is obtained by dividing the necessary total addition amount Qrich by the required addition flow rate Qt, decreases. Therefore, the first lean period, which is determined based on the cycle period Tint, the rich period, and the like using the expression (2), decreases. The broken arrow Y4 in FIG. 9 indicates the duration of the first lean period, which is determined when the required addition flow rate Qt has not been increased by the amount $\Delta Q$. Further, if the required addition flow rate Qt increases and the speed at which the required addition amount $\Sigma Qr$ increases also increases, the timing when the required addition amount $\Sigma Qr$ reaches the actual addition amount $\Sigma Q$ after the end of the rich period (T14 to T15) is advanced. Therefore, the duration of the second lean period (T15 to T16) decreases. The broken arrow Y5 in FIG. 9 indicates the length of the second lean period, which is determined based on the required addition flow rate Qt that has not been increased by the amount $\Delta Q$.

With the configuration described above, in the subsequent cycle, the duration of the total lean period (the first lean period+the second lean period) may be made shorter than the rich period. By thus reducing the duration of the lean period relative to the rich period, the amount of heat generated through oxidation of unburned fuel components in the NOx catalyst in the subsequent cycle is restrained from becoming insufficient, and furthermore, the deficiency in the amount of heat generated in the previous cycle is compensated for as well.

According to the second embodiment of the invention, the following effects are obtained. (3) If the actual addition amount $\Sigma Q$ is below the required addition amount $\Sigma Qr$ at the end of a predetermined cycle, the required addition flow rate Qt in a subsequent cycle is increased by the amount $\Delta Q$, and the duration of the first lean period and the second lean period in the subsequent cycle are reduced based on the increased required addition flow rate Qt, so that duration of the lean period is made shorter than that of the rich period. Thus, the amount of heat generated through oxidation of unburned fuel components in the NOx catalyst in raising the average of the catalyst bed temperature to the target bed temperature in the subsequent cycle is restrained from becoming insufficient. Accordingly, the average of the catalyst bed temperature is restrained from falling below the target bed temperature due to deficiencies in the amount of heat generation in consecutive cycles. Further, in the subsequent cycle, the lean period is made shorter than the rich period, so that the amount of heat generated from unburned fuel components in the NOx catalyst increases. Therefore, the deficiency in the amount of heat generated in the previous cycle may thereby be compensated for.

(4) If the duration of the rich period during the subsequent cycle (T14 to T15 in FIG. 9) decreases due to changes in the engine operation state during that rich period thereby the rich period and the second lean period end to end the cycle, the first lean period becomes too long with respect to the rich period in that cycle. However, the lean period (the first lean period) is restrained to the maximum possible extent from becoming too long with respect to the rich period, through the reduction of the first lean period based on the increase in the required addition flow rate Qt by the amount $\Delta Q$. Accordingly, the deficiency of the amount of heat generated through oxidation of unburned fuel components in the NOx catalyst in raising the average of the catalyst bed temperature to the target bed temperature, which results from a state where the first lean period becomes too long with respect to the rich period in the subsequent cycle, may be held small. Thus, under the above situation, an effect similar to the effect described in the modified example of the first embodiment of the invention, namely, an effect similar to the effect (1) in the first embodiment of the invention may be obtained.

Figure 10A:
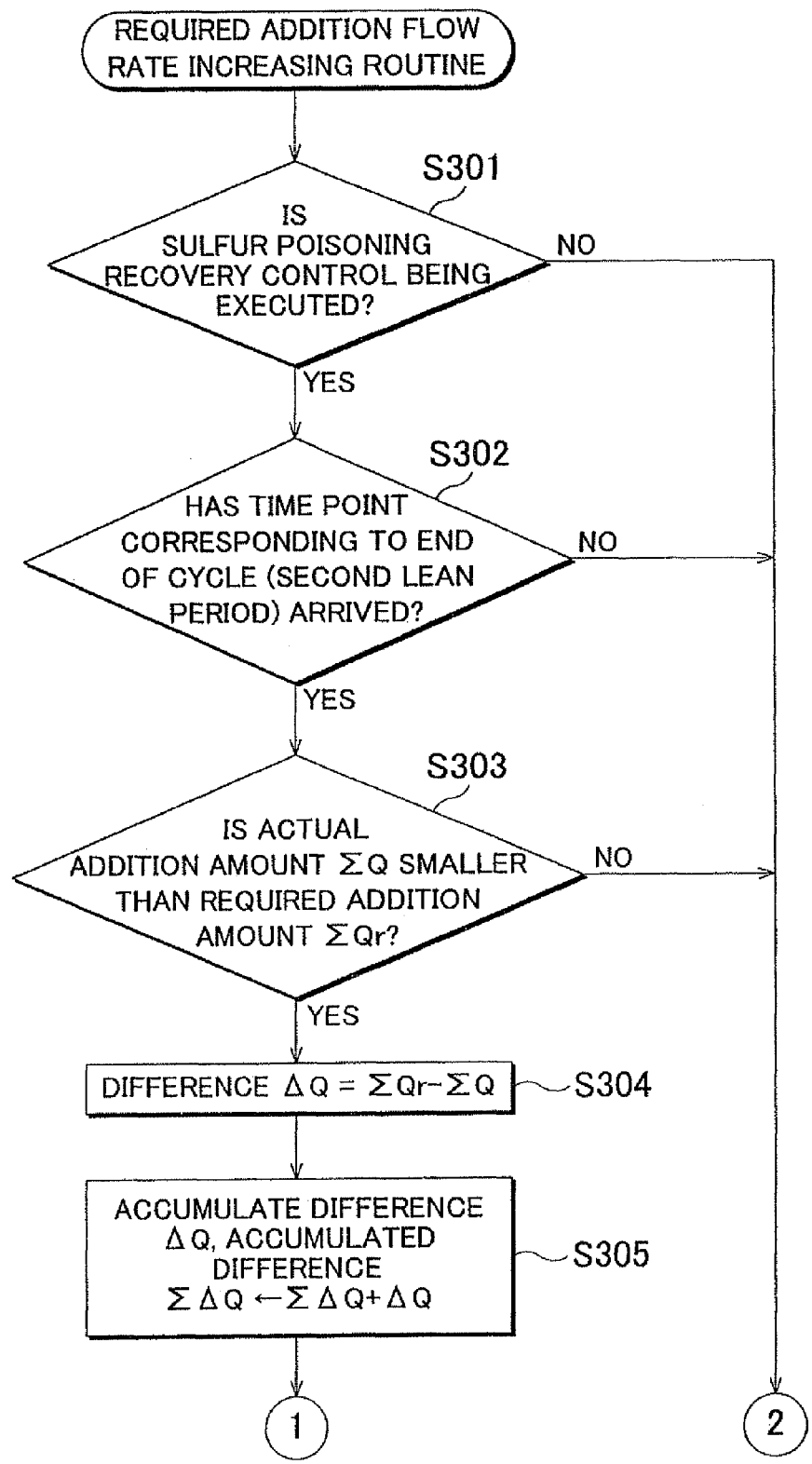
FIGS. 10A and 10B are flowcharts showing a modified example of a required addition flow rate increasing procedure in the second embodiment of the invention.
Figure 10B:
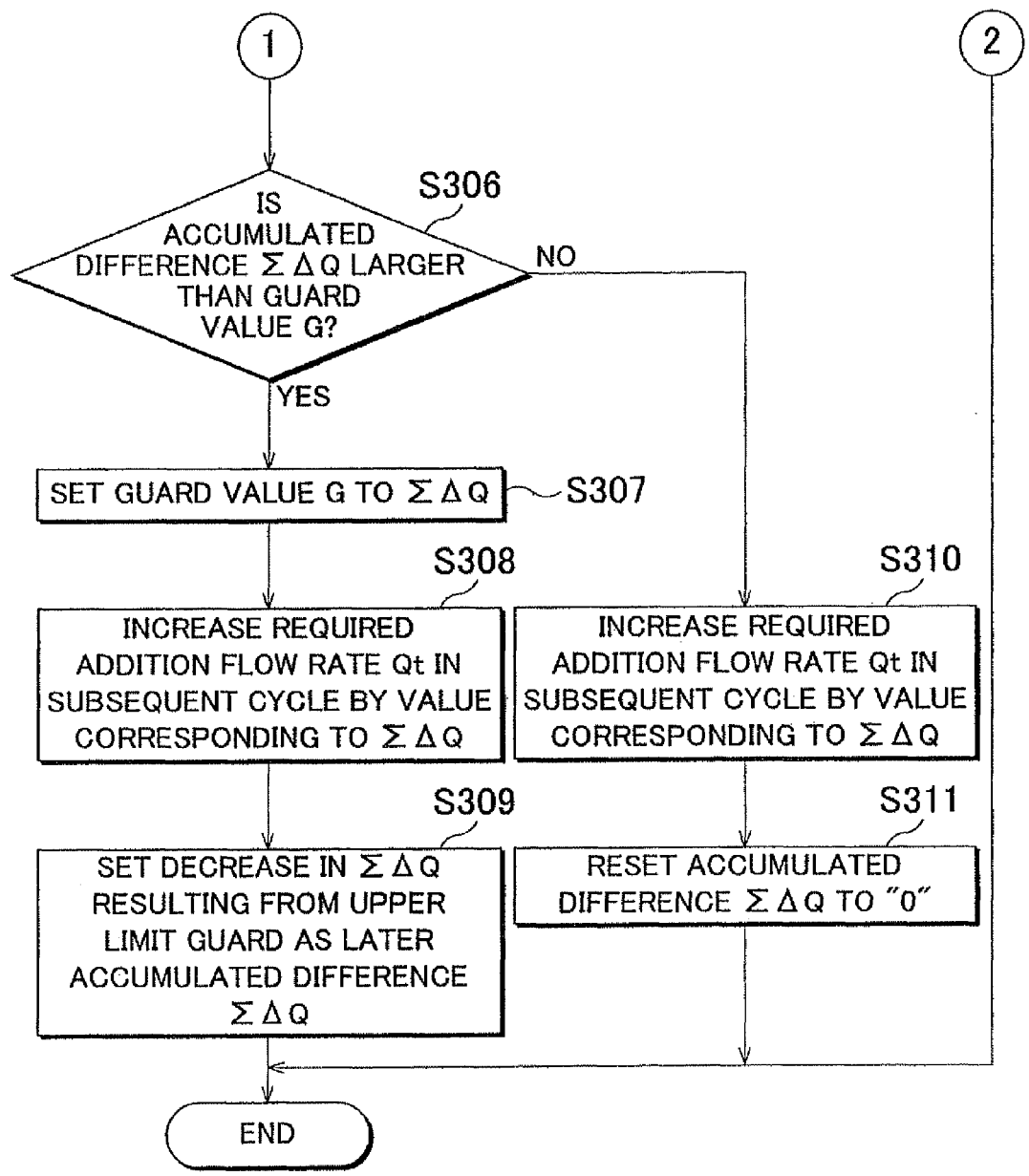

The second embodiment of the invention may also be modified, for example, as follows. If the actual addition amount $\Sigma Q$ falls short of the required addition amount $\Sigma Qr$ at the end of a cycle, the required addition flow rate Qt in a subsequent cycle may be increased (the requirement increasing process) according to a flowchart of a required addition flow rate increasing routine shown in FIG. 10A and FIG. 10B, so that the deficiency in the actual addition amount $\Sigma Q$ may be appropriately compensated for in the subsequent cycle.

In this routine, if a cycle (the second lean period) has just ended during the sulfur poisoning recovery control (YES in both S301 and S302), it is determined whether the actual addition amount $\Sigma Q$ is below the required addition amount $\Sigma Qr$ (S303). Then, if a positive determination is made in step S303, the difference $\Delta Q$ between the actual addition amount $\Sigma Q$ and the required addition amount $\Sigma Qr$ is calculated as the insufficiency of the actual addition amount $\Sigma Q$ with respect to the required addition amount $\Sigma Qr$ (S304). Furthermore, the accumulated difference $\Sigma \Delta Q$ obtained by accumulating the difference $\Delta Q$ is calculated (S305). That is, a value obtained by adding the difference $\Delta Q$ to the present accumulated difference $\Sigma \Delta Q$ is calculated as a current accumulated difference $\Sigma \Delta Q$. The accumulated difference $\Sigma \Delta Q$ thus calculated is used for increasing the required addition flow rate Qt by an amount equal to the accumulated difference $\Sigma \Delta Q$.

After the accumulated difference $\Sigma \Delta Q$ is calculated as described above, the accumulated difference $\Sigma \Delta Q$ is subjected to an upper limit guard process based on a guard value G for avoiding the breakdown of the control for raising the average of the catalyst bed temperature to the target bed temperature (S306, S307). That is, if the accumulated difference $\Sigma \Delta Q$ exceeds the guard value G (YES in S306), a reduction of this accumulated difference $\Sigma \Delta Q$ to the guard value G is made (S307). Then, as the requirement increasing process, the required addition flow rate Qt in a subsequent cycle is increased by a value corresponding to the accumulated difference $\Sigma \Delta Q$ (the guard value G) (S308). On the other hand, if the accumulated difference $\Sigma \Delta Q$ is equal to or smaller than the guard value G in step S306, the required addition flow rate Qt in the subsequent cycle is increased by a value corresponding to the accumulated difference $\Sigma \Delta Q$ the guard value G) as the requirement increasing process (S310).

Then, if the upper limit guard is not carried out (S306: NO) when executing the upper limit guard process (S306, S307), the accumulated difference $\Sigma \Delta Q$ is reset to "0" (S311) after executing of the requirement increasing process (S310). On the other hand, when the upper limit guard is carried out (S307) when executing the upper limit guard process (S306, S307), a decrease in the accumulated difference $\Sigma \Delta Q$ resulting from the upper limit guard is set as the accumulated difference $\Sigma \Delta Q$ (S309) after the execution of the requirement increasing process (S308).

In this example, the difference $\Delta Q$ between the actual addition amount $\Sigma Q$ and the required addition amount $\Sigma Qr$ at the end of a cycle (the second lean period) is accumulated as the accumulated difference $\Sigma \Delta Q$, and the required addition flow rate Qt in the subsequent cycle is increased by an amount equal to the accumulated difference $\Sigma \Delta Q$ to compensate for the deficiency in the actual addition amount $\Sigma Q$ with respect to the required addition amount $\Sigma Qr$ in the cycle. However, if the accumulated difference $\Sigma \Delta Q$ becomes too large, the control for raising the average of the catalyst bed temperature to the target bed temperature goes out of control. Therefore, the upper limit guard process for carrying out the upper guard of the accumulated difference $\Sigma \Delta Q$ by the guard value G is executed to avoid being out of control. Then, if the upper limit guard of the accumulated difference $\Sigma \Delta Q$ is carried out through the upper limit guard process, the decreased amount of the accumulated difference $\Sigma \Delta Q$ resulting from the upper limit guard is set as the accumulated difference $\Sigma \Delta Q$ after executing the requirement increasing processing process, and furthermore, the required addition flow rate Qt is increased by an amount equal to the accumulated difference $\Sigma \Delta Q$ in a later cycle.

With the above configuration, the insufficiency of the actual addition amount $\Sigma Q$ with respect to the required addition amount $\Sigma Qr$ can be appropriately compensated for in a subsequent cycle or a later cycle while restraining the control for raising the average of the catalyst bed temperature to the target bed temperature from being out of control due to an excessive increase in the accumulated difference $\Sigma \Delta Q$.

Figure 11:
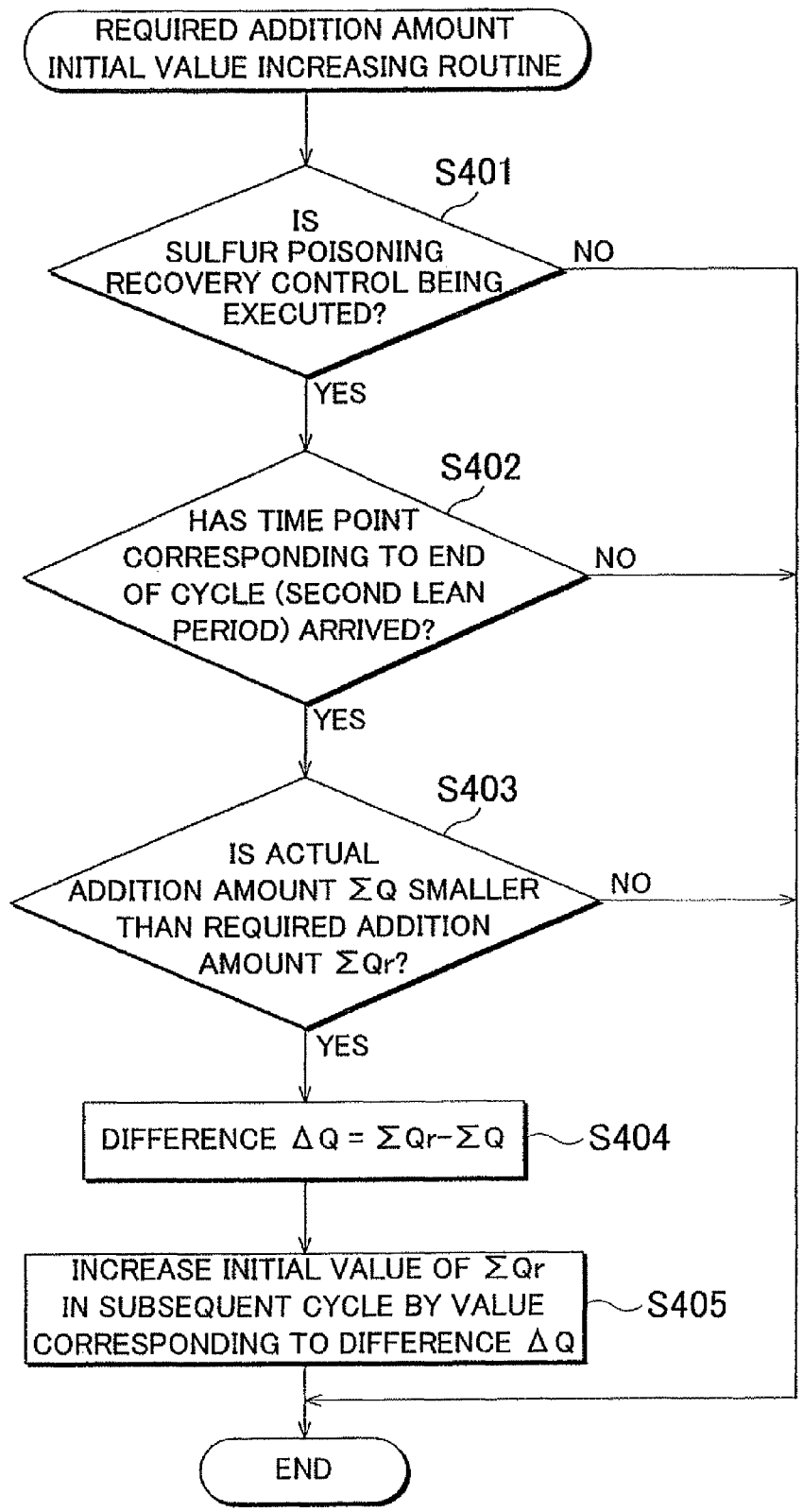
FIG. 11 is a flowchart showing a required addition amount initial value increasing routine.

Next, the third embodiment of the invention will be described with reference to FIGS. 11 and 12. In the third embodiment of the invention, if the actual addition amount $\Sigma Q$ is below the required addition amount $\Sigma Qr$ at the end of a cycle, the requirement increasing process is executed. That is, the initial value ("0" in this example) of the required addition amount $\Sigma Qr$ is increased in a subsequent cycle. More specifically, the initial value of the required addition amount $\Sigma Qr$ in the subsequent cycle is increased according to a flowchart of FIG. 11, which shows a required addition amount initial value increase routine.

The required addition amount initial value increase routine is periodically executed by the electronic control unit 50 at predetermined intervals. In this routine, if a cycle (the second lean period) has just ended during the sulfur poisoning recovery control (YES in both S401 and S402), it is determined whether the actual addition amount $\Sigma Q$ is smaller than the required addition amount $\Sigma Qr$ (S403). Then, if a positive determination is made in step S403, the difference $\Delta Q$ between the actual addition amount $\Sigma Q$ and the required addition amount $\Sigma Qr$ is calculated as an insufficiency of the actual addition amount $\Sigma Q$ with respect to the required addition amount $\Sigma Qr$ (S404). Then, the initial value of the required addition amount $\Sigma Qr$ in a subsequent cycle is increased by an amount to the difference $\Delta Q$ (S405).

Figure 12:
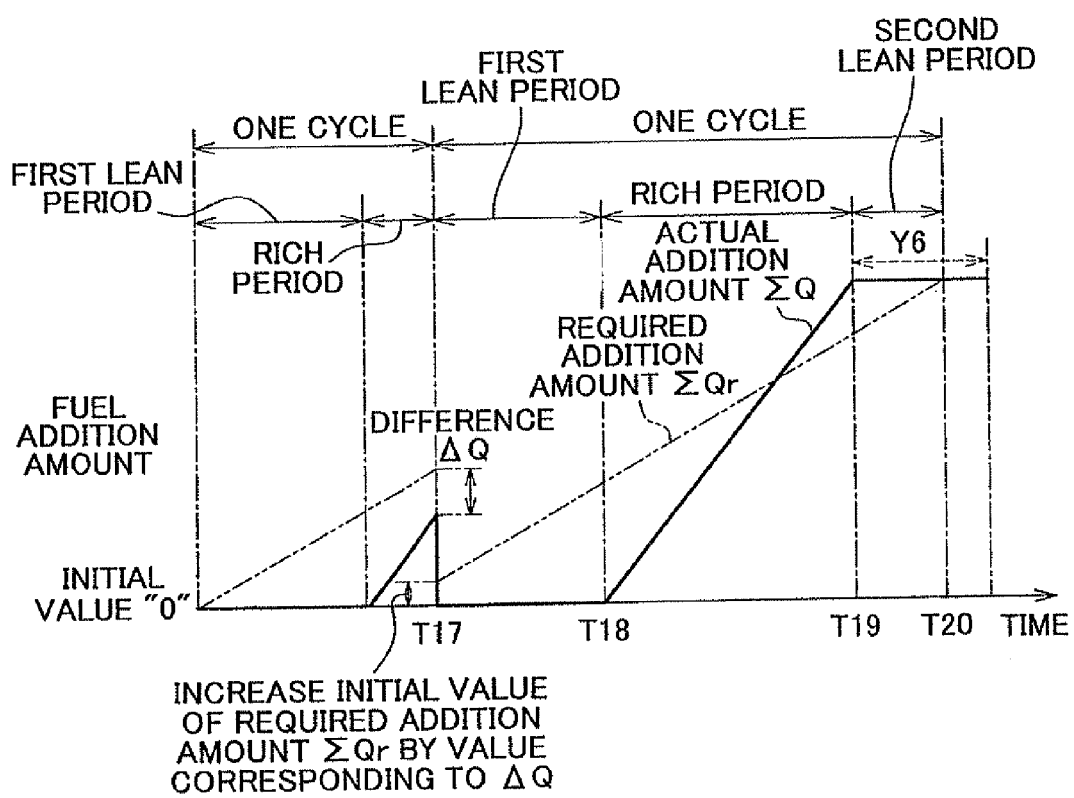
FIG. 12 is a time chart showing transitions of the required addition amount and an actual addition amount during the sulfur poisoning recovery control in the third embodiment of the invention.

Thus, as shown in FIG. 12, if the actual addition amount $\Sigma Q$ is below the required addition amount $\Sigma Qr$ at the end of a predetermined cycle (T17), the initial value of the required addition amount $\Sigma Qr$ in a subsequent cycle (after T17) is increased by an amount corresponding to the difference $\Delta Q$. Then, the timing when the required addition amount $\Sigma Qr$ reaches the actual addition amount $\Sigma Q$ after the end of the rich period (T18 to T19) in the cycle is advanced correspondingly, and the time to the timing when the required addition amount $\Sigma Qr$ reaches the actual addition amount $\Sigma Q$ after the lapse of the rich period, namely, the second lean period (T19 to T20) is reduced correspondingly. A broken arrow Y6 in FIG. 12 indicates the duration of the second lean period, which is determined based on the initial required addition amount $\Sigma Qr$, before the required addition amount $\Sigma Qr$ is increased by the amount $\Delta Q$.

With configuration as described above, the total lean period (the first lean period+the second lean period) in the subsequent cycle may be set shorter than the rich period. By thus making the duration of the lean period shorter than that of the rich period, a deficiency in the amount of heat generated through oxidation of unburned fuel components in the NOx catalyst in raising the average of the catalyst bed temperature to the target bed temperature in the subsequent cycle is restrained, and furthermore, the deficiency in the amount of heat generation in the preceding cycle is compensated for as well.

According to the third embodiment of the invention, the following effect is obtained. (5) When the actual addition amount $\Sigma Q$ is below the required addition amount $\Sigma Qr$ at the end of a cycle, the initial value of the required addition amount $\Sigma Qr$ in a subsequent cycle is increased by the amount $\Delta Q$, and the second lean period in the subsequent cycle is reduced based on the increased initial value, so that the duration of the lean period is made shorter than the rich period. Thus, deficiencies in the amount of heat generated through oxidation of unburned fuel components in the NOx catalyst in raising the average of the catalyst bed temperature to the target bed temperature are restrained. Accordingly, the average of the catalyst bed temperature is restrained from falling below the target bed temperature as a result of the deficiency in the amount of heat generation in consecutive cycles. Further, in the subsequent cycle, the lean period is made shorter than the rich period, and the amount of heat generated from unburned fuel components in the NOx catalyst is increased. Therefore, the deficiency in the amount of heat generation in the previous cycle may thereby be compensated for.

Figure 13A:
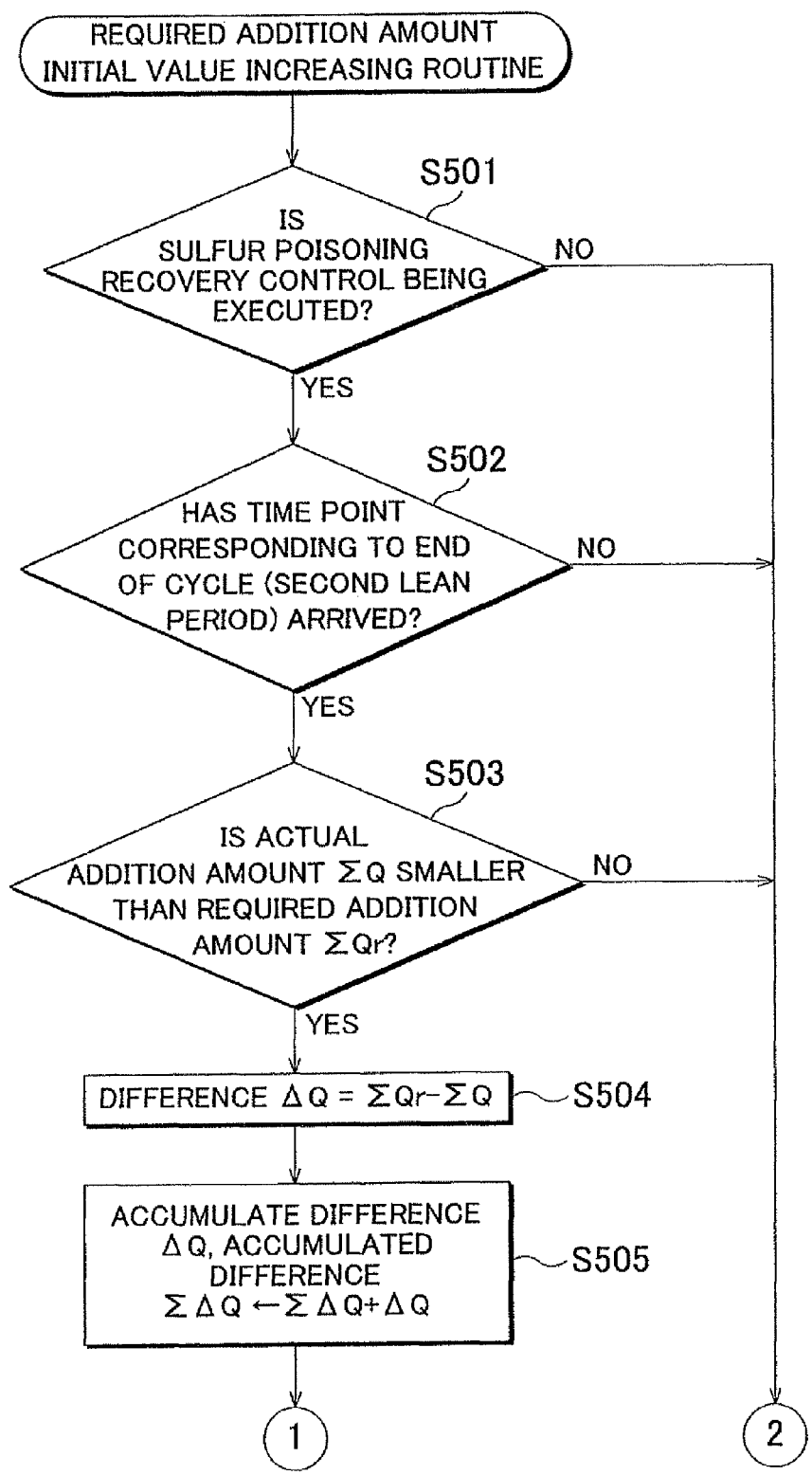
FIGS. 13A and 13B are flowcharts showing a modified example of a required addition amount initial value increasing procedure in the third embodiment of the invention.
Figure 13B:
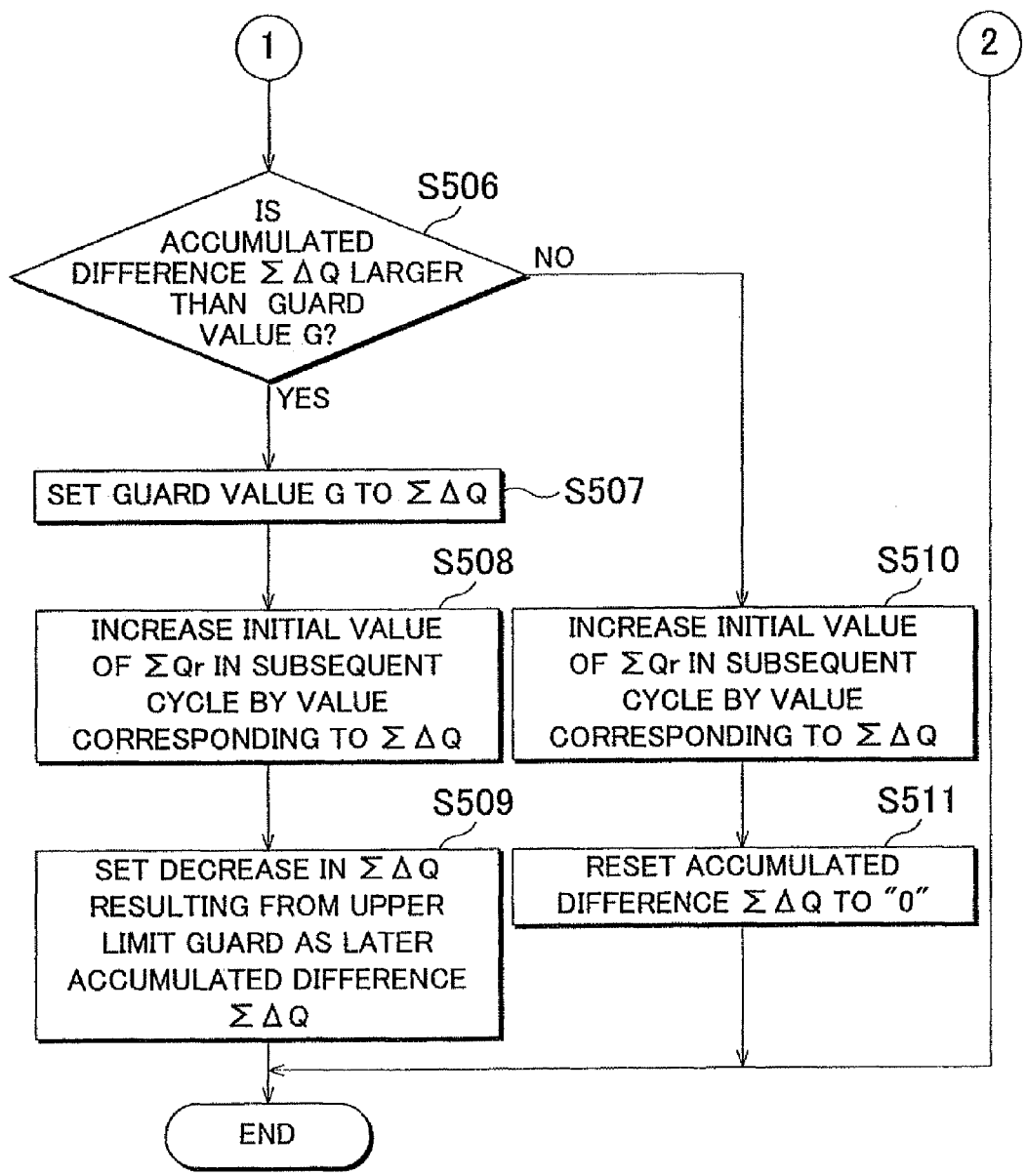

The foregoing third embodiment of the invention can also be modified, for example, as follows. When the actual addition amount $\Sigma Q$ is insufficient with respect to the required addition amount $\Sigma Qr$ at the time point corresponding to the end of a predetermined cycle, the initial value of the required addition amount $\Sigma Qr$ in a subsequent cycle or a later cycle may be increased (a requirement increasing process) according to a flowchart of a required addition amount initial value increasing routine shown in FIG. 13A and FIG. 13B, so that the deficiency in the actual addition amount $\Sigma Q$ may be appropriately compensated for in a subsequent cycle.

In this routine, if a cycle (the second lean period) has just ended during the sulfur poisoning recovery control (YES in both S501 and S502), it is determined whether or not the actual addition amount $\Sigma Q$ is smaller than the required addition amount $\Sigma Qr$ (S503). Then, if a positive determination is made in step S503, the difference $\Delta Q$ between the actual addition amount $\Sigma Q$ and the required addition amount $\Sigma Qr$ is calculated as an insufficiency of the actual addition amount $\Sigma Q$ with respect to the required addition amount $\Sigma Qr$ (S504). Furthermore, the accumulated difference $\Sigma \Delta Q$ is calculated (S505). That is, the difference $\Delta Q$ is added to the present accumulated difference $\Sigma \Delta Q$ to obtain the current accumulated difference $\Sigma \Delta Q$. The accumulated difference $\Sigma \Delta Q$ thus calculated is used for increasing the initial value of the required addition amount $\Sigma Qr$.

Once calculated, the accumulated difference $\Sigma \Delta Q$ is subjected to the upper limit guard process based on the guard value G to avoid the breakdown of the control for raising the average of the catalyst bed temperature to the target bed temperature (S506, S507). That is, if the accumulated difference $\Sigma \Delta Q$ is exceeds the guard value G (S506: YES), the accumulated difference $\Sigma \Delta Q$ is set to the guard value G (S507). Then, in a requirement increasing process, the initial value of the required addition amount $\Sigma Qr$ of a subsequent cycle is increased by an amount equal to the accumulated difference $\Sigma \Delta Q$ (the guard value G) (S508). On the other hand, if the accumulated difference $\Sigma \Delta Q$ is equal to or smaller than the guard value G in step S506, the initial value of the required addition amount $\Sigma Qr$ in the subsequent cycle is increased by an amount equal to the accumulated difference $\Sigma \Delta Q$ the guard value G) in the requirement increasing process (S510).

Then, if the upper limit guard process is not executed (S506: NO), the accumulated difference $\Sigma \Delta Q$ is reset to "0" (S511) after the execution of the requirement increasing process (S510). On the other hand, if the upper limit guard process is executed (S507), a decreased amount of the accumulated difference $\Sigma \Delta Q$ resulting from the upper limit guard is set as the accumulated difference $\Sigma \Delta Q$ (S509) after execution of the requirement increasing process (S508).

In this example, the difference $\Delta Q$ between the actual addition amount $\Sigma Q$ and the required addition amount $\Sigma Qr$ at the end of a cycle (the second lean period) is accumulated as the accumulated difference $\Sigma \Delta Q$, and the initial value of the required addition amount $\Sigma Qr$ in a subsequent cycle is increased by an amount equal to the accumulated difference $\Sigma \Delta Q$. The deficiency in the actual addition amount $\Sigma Q$ with respect to the required addition amount $\Sigma Qr$ is thereby compensated for. However, if the accumulated difference $\Sigma \Delta Q$ is excessive, the control for raising the average of the catalyst bed temperature to the target bed temperature goes out of control. Therefore, the upper limit guard process is executed to avoid the breakdown of the control. Then, if the upper limit guard of the accumulated difference $\Sigma \Delta Q$ is carried out through the upper limit guard process, a decreased amount of the accumulated difference $\Sigma \Delta Q$ resulting from the upper limit guard is set as the accumulated difference ΣΔQ after executing the requirement increasing process, and furthermore, the initial value of the required addition amount ΣQr in a subsequent cycle is increased by an amount equal to the accumulated difference ΣΔQ.

With the foregoing configuration, the deficiencies in the actual addition amount ΣQ with respect to the required addition amount ΣQr may be appropriately compensated for in a subsequent cycle while restraining the control for raising the average of the catalyst bed temperature to the target bed temperature from being out of control due to an excessive increase in the accumulated difference ΣΔQ.

The requirement increasing process in the second embodiment of the invention and the requirement increasing process in the third embodiment of the invention may be executed simultaneously.

If the filter regeneration control for increasing the average of the catalyst bed temperature of the catalyst provided in the exhaust system to the target bed temperature is executed to eliminate the clogging of the PM filter 26 by particulate matter, the invention may be applied to the control for raising the average of the catalyst bed temperature to the target bed temperature in the filter regeneration control.

In each of the foregoing embodiments of the invention, unburned fuel components may be supplied to the NOx catalyst through fuel injection from the injector 40 in an exhaust stroke or the like.

The invention claimed is:

1. An exhaust gas purification device for an internal combustion engine comprising:
   a control portion that sets, a first lean period, a rich period, and a second lean period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and that repeats the cycle to raise an average of a catalyst bed temperature to a target bed temperature, wherein
   the control portion sets a duration of the rich period based on an engine operation state, sets a duration of the first lean period based on the duration of the rich period, calculates a required flow rate of unburned fuel components supplied to the catalyst to make the average of the catalyst bed temperature equal to the target bed temperature through continuous supply of the unburned fuel components to the catalyst, calculates a required fuel amount of the total unburned fuel components to be supplied to the catalyst at the required flow rate from a start of the first lean period, supplies unburned fuel components to the catalyst at a flow rate higher than the required flow rate during the rich period, calculates an actual fuel amount of unburned fuel components actually supplied to the catalyst from the start of the rich period, sets a period from when the rich period has ended to when the actual fuel amount becomes equal to or smaller than the required fuel amount as the second lean period, resets both the required fuel amount and the actual fuel amount to their initial values when the second lean period ends, and sets the duration of the first lean period in a subsequent cycle shorter than that is set based on the duration of the rich period if the actual fuel amount is below the required fuel amount when the cycle ends.

2. The exhaust gas purification device according to claim 1, wherein the control portion sets the duration of the first lean period in a subsequent cycle to "0" if the actual fuel amount is below the required fuel amount when the cycle ends.

3. The exhaust gas purification device according to claim 1, wherein the control portion calculates a reduction amount by which to reduce the duration of the first lean period in the subsequent cycle based on the amount by which the actual fuel amount is below the required fuel amount and sets the duration of the first lean period in a subsequent cycle shorter than that is set based on the duration of the rich period by the reduction amount if the actual fuel amount is below the required fuel amount when the cycle ends.

4. An exhaust gas purification device for an internal combustion engine comprising:
   a control portion that sets, a first lean period, a rich period, and a second lean period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and that repeats the cycle to raise an average of a catalyst bed temperature to a target bed temperature, wherein
   the control portion sets a duration of the rich period based on an engine operation state, sets a duration of the first lean period based on the duration of the rich period, calculates a required flow rate of unburned fuel components supplied to the catalyst to make the average of the catalyst bed temperature equal to the target bed temperature through continuous supply of the unburned fuel components to the catalyst, calculates a required fuel amount of the total unburned fuel components to be supplied to the catalyst at the required flow rate from a start of the first lean period, supplies unburned fuel components to the catalyst at a flow rate higher than the required flow rate during the rich period, calculates an actual fuel amount of unburned fuel components actually supplied to the catalyst from the start of the rich period, sets a period from when the rich period has ended to when the actual fuel amount becomes equal to or smaller than the required fuel amount as the second lean period, resets both the required fuel amount and the actual fuel amount to their initial values when the second lean period ends, and executes a requirement increasing process to increase at least one of the required flow rate and the initial value of the required fuel amount in a subsequent cycle by an amount equal to a difference between the actual fuel amount and the required fuel amount if the actual fuel amount is below the required fuel amount when the cycle ends.

5. The exhaust gas purification device according to claim 4, wherein the control portion sets the duration of the first lean period based on the duration of the rich period and the required flow rate, and increases the required flow rate in a subsequent the cycle by an amount equal to the difference between the actual fuel amount and the required fuel amount in the requirement increasing process if the actual fuel amount is below the required fuel amount when the cycle ends.

6. The exhaust gas purification device according to claim 4, wherein the control portion accumulates the difference between the actual fuel amount and the required fuel amount as an accumulated difference, increases at least one of the required flow rate and the initial value of the required fuel amount in a subsequent cycle by an amount equal to the accumulated difference in the requirement increasing process if the actual fuel amount is below the required fuel amount when the cycle ends, executes an upper limit guard process based on a guard value to avoid a breakdown of control for raising the average of the catalyst bed temperature to the target bed temperature due to the execution of the requirement increasing process, resets the accumulated difference to "0" after execution of the requirement increasing process if the upper limit guard process is not executed, and sets a decrease in the accumulated difference resulting from the upper limit guard process as the accumulated difference after execution of the requirement increasing process if the upper limit guard process is executed.

7. A method of controlling an exhaust gas purification device for an internal combustion engine comprising:
   setting, a first lean period, a rich period, and a second lean period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped, and repeating the cycle to raise an average of a catalyst bed temperature to a target bed temperature;
   setting a duration of the rich period based on an engine operation state and setting a duration of the first lean period based on the duration of the rich period;
   calculating a required flow rate of unburned fuel components supplied to the catalyst to make the average of the catalyst bed temperature equal to the target bed temperature through continuous supply of the unburned fuel components to the catalyst;
   calculating a required fuel amount of the total unburned fuel components to be supplied to the catalyst at the required flow rate from a start of the first lean period;
   supplying unburned fuel components to the catalyst at a flow rate higher than the required flow rate during the rich period;
   calculating an actual fuel amount of unburned fuel components actually supplied to the catalyst from the start of the rich period;
   setting a period from when the rich period has ended to when the actual fuel amount becomes equal to or smaller than the required fuel amount as the second lean period and resetting both the required fuel amount and the actual fuel amount to their initial values when the second lean period ends; and
   setting the duration of the first lean period in a subsequent cycle shorter than that is set based on the duration of the rich period if the actual fuel amount is below the required fuel amount when the cycle ends.

8. The method according to claim 7, further comprising:
   setting the duration of the first lean period in a subsequent cycle to "0" if the actual fuel amount is below the required fuel amount when the cycle ends.

9. The method according to claim 7, further comprising:
   calculating a reduction amount by which to reduce the duration of the first lean period in the subsequent cycle based on the amount by which the actual fuel amount is below the required fuel amount and setting the duration of the first lean period in a subsequent cycle shorter than that is set based on the duration of the rich period by the reduction amount if the actual fuel amount is below the required fuel amount when the cycle ends.

10. A method of controlling an exhaust gas purification device for an internal combustion engine, the method comprising:
    setting, a first lean period, a rich period, and a second lean period as a cycle, wherein during the first lean period, unburned fuel components are not supplied to a catalyst in order to make the atmosphere around the catalyst lean; during the rich period, unburned fuel components are supplied to the catalyst to make the atmosphere around the catalyst rich; and during the second lean period, the supply of unburned fuel components to the catalyst is stopped; repeating the cycle to raise an average of a catalyst bed temperature to a target bed temperature;
    setting a duration of the rich period based on an engine operation state and setting a duration of the first lean period based on the duration of the rich period;
    calculating a required flow rate of unburned fuel components supplied to the catalyst to make the average of the catalyst bed temperature equal to the target bed temperature through continuous supply of the unburned fuel components to the catalyst;
    calculating a required fuel amount of the total unburned fuel components to be supplied to the catalyst at the required flow rate from a start of the first lean period;
    supplying unburned fuel components to the catalyst at a flow rate higher than the required flow rate during the rich period;
    calculating an actual fuel amount of unburned fuel components actually supplied to the catalyst from the start of the rich period;
    setting a period from when the rich period has ended to when the actual fuel amount becomes equal to or smaller than the required fuel amount as the second lean period and resetting both the required fuel amount and the actual fuel amount to their initial values when the second lean period ends; and
    executing a requirement increasing process to increase at least one of the required flow rate and the initial value of the required fuel amount in a subsequent cycle by an amount equal to a difference between the actual fuel amount and the required fuel amount if the actual fuel amount is below the required fuel amount when the cycle ends.

11. The method according to claim 10, further comprising:
    setting the duration of the first lean period based on the duration of the rich period and the required flow rate, and increasing the required flow rate in a subsequent cycle by an amount equal to the difference between the actual fuel amount and the required fuel amount in the requirement increasing process if the actual fuel amount is below the required fuel amount when the cycle ends.

12. The method according to claim 10, further comprising:
    accumulating the difference between the actual fuel amount and the required fuel amount as an accumulated difference;
    increasing at least one of the required flow rate and the initial value of the required fuel amount in a subsequent cycle by an amount equal to the accumulated difference in the requirement increasing process if the actual fuel amount is below the required fuel amount when the cycle ends;
    executing an upper limit guard process based on a guard value to avoid a breakdown of control for raising the average of the catalyst bed temperature to the target bed temperature due to the execution of the requirement increasing process;

resetting the accumulated difference to "0" after execution of the requirement increasing process if the upper limit guard process is not executed; and setting a decrease in the accumulated difference resulting from the upper limit guard process as the accumulated difference after execution of the requirement increasing process if the upper limit guard process is executed.

* * * * *